(12) United States Patent
Pinkowski

(10) Patent No.: US 7,799,992 B2
(45) Date of Patent: Sep. 21, 2010

(54) COVER PLATE FOR SURFACE MOUNT JUNCTION BOX WITH LOCKING MEMBER

(76) Inventor: Marvin Pinkowski, 907 Brown Deer Ave., Friendship, WI (US) 53934

( * ) Notice: Subject to any disclaimer, the term of this patent is extended or adjusted under 35 U.S.C. 154(b) by 428 days.

(21) Appl. No.: 11/972,756

(22) Filed: Jan. 11, 2008

(65) Prior Publication Data
US 2009/0178823 A1  Jul. 16, 2009

(51) Int. Cl.
*H02G 3/14* (2006.01)
(52) U.S. Cl. .............. 174/66; 174/67; 220/241; 439/135
(58) Field of Classification Search .............. 174/66, 174/67; 220/241, 242; 439/135, 137; 312/328; D8/353; D13/177
See application file for complete search history.

(56) References Cited

U.S. PATENT DOCUMENTS

| | | | |
|---|---|---|---|
| 2,934,590 A | | 4/1960 | Thompson et al. |
| 3,168,612 A | | 2/1965 | Sorenson |
| 3,185,760 A | | 5/1965 | Despard |
| 3,662,085 A | | 5/1972 | Robinson et al. |
| 3,953,933 A | * | 5/1976 | Goldstein ............ 40/642.02 |
| 4,500,746 A | | 2/1985 | Meehan |
| 5,170,013 A | | 12/1992 | Borsh et al. |
| 5,223,673 A | | 6/1993 | Mason |
| 5,477,010 A | * | 12/1995 | Buckshaw et al. ......... 174/67 |
| 5,594,205 A | | 1/1997 | Cancellieri et al. |
| 5,873,553 A | | 2/1999 | Stahl et al. |
| 6,172,301 B1 | * | 1/2001 | Goodsell ............... 174/66 |
| 6,242,698 B1 | | 6/2001 | Baker, III et al. |
| 6,398,594 B1 | | 6/2002 | Bonilla et al. |
| 6,441,304 B1 | | 8/2002 | Currier et al. |
| 6,552,269 B1 | | 4/2003 | Conner |
| 6,563,051 B1 | | 5/2003 | Shotey et al. |
| 6,616,005 B1 | | 9/2003 | Pereira et al. |
| 7,052,221 B2 | | 5/2006 | Bentrim |
| 7,056,145 B2 | | 6/2006 | Campbell, III et al. |
| 7,071,414 B2 | | 7/2006 | Kim |
| 7,323,639 B1 | * | 1/2008 | Shotey et al. ............ 174/66 |
| 7,425,681 B2 | * | 9/2008 | Xu et al. ................ 174/66 |

* cited by examiner

*Primary Examiner*—Dhiru R Patel
(74) *Attorney, Agent, or Firm*—Jansson Shupe & Munger Ltd.

(57) ABSTRACT

A cover plate assembly for mounting an electrical circuit device to an electrical outlet box includes at least one electrical circuit device and a cover plate. The cover plate has a locking member rigidly mounted to its rear surface, whereby the attachment member mounted upon the electrical circuit device is slidably received and restrained by the locking member to secure the electrical circuit device to the cover plate utilizing only the locking member. The locking member is preferably at least two flexibly resilient panels spaced apart so that each panel contacts the attachment member when inserted into the locking member. Both panels are preferably rigidly mounted to the cover plate's interior surface and have inner surfaces sloping outward from their lower edge so that the distance is greatest between their upper edges. These panels are spaced above the cover plate's back face by a distance substantially equal to the attachment member's depth to restrain the attachment member beneath the locking member when it is inserted through the locking member. A method for installing an electrical circuit device to an electrical outlet box is also disclosed.

26 Claims, 11 Drawing Sheets

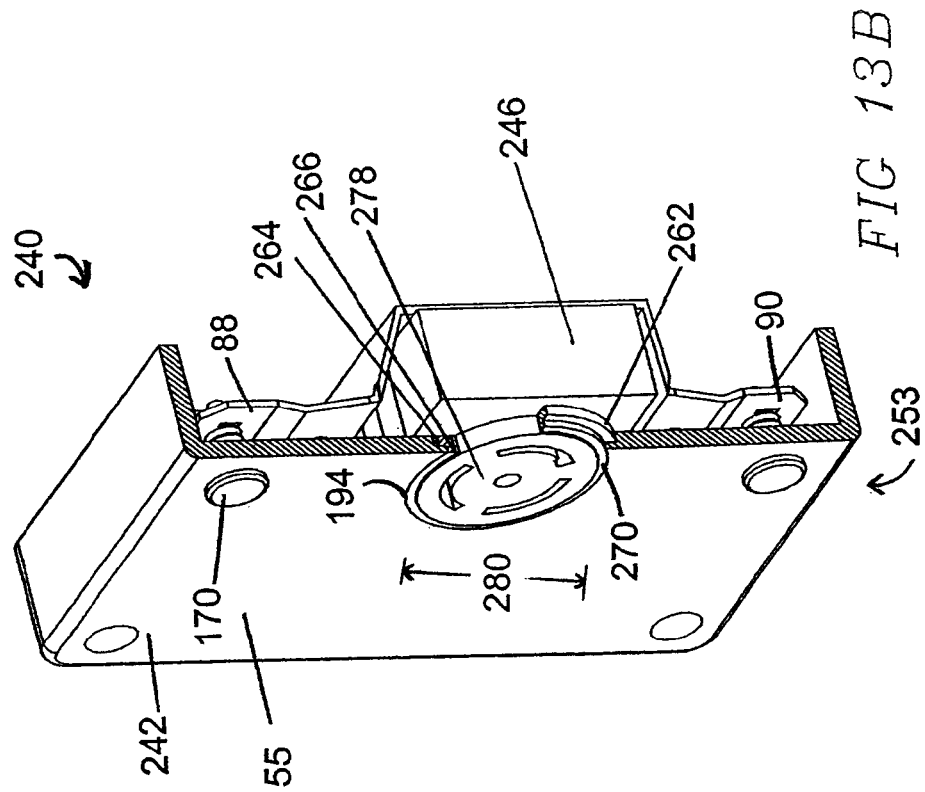
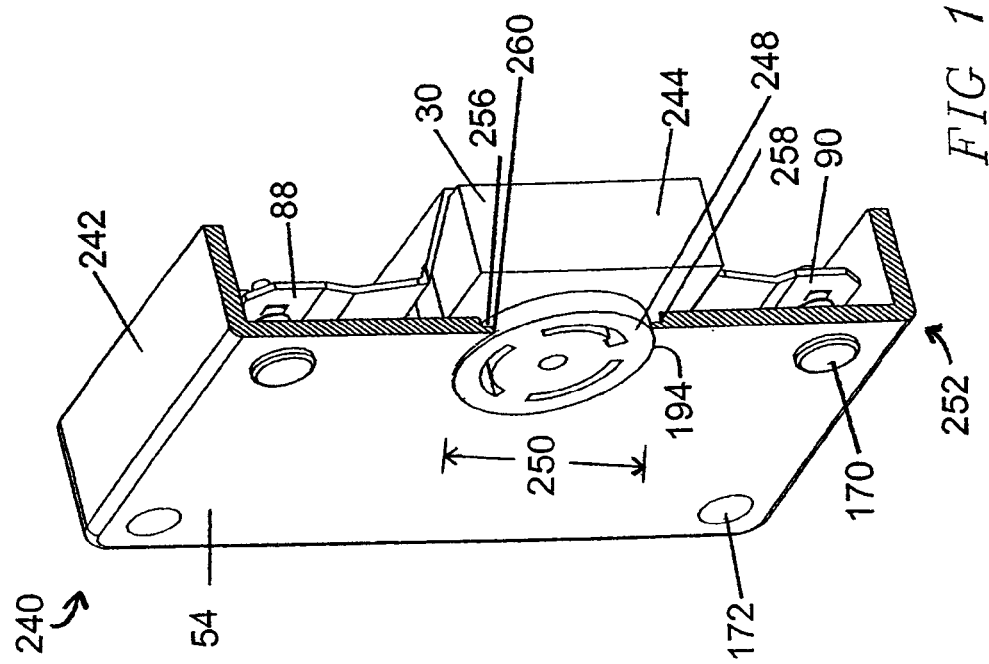

COVER PLATE FOR SURFACE MOUNT JUNCTION BOX WITH LOCKING MEMBER

FIELD OF THE INVENTION

This invention is related generally to cover plate assemblies for electrical outlet boxes and, more particularly, cover plate assemblies for surface mounted electrical outlet boxes.

BACKGROUND OF THE INVENTION

Prevailing building and safety codes such as the National Electrical Code of the National Fire Protection Association, which has been adopted by many states and municipalities, require that electrical wiring connections to electrical circuit devices from an electrical circuit or electrical conduit occur in an enclosed electrical outlet or junction box housing.

The electrical outlet box is available in a variety of styles and shapes, but each has a concave interior cavity with a substantially planar opening. Cover plates (also called face plates) for these boxes have openings of various standard sizes and shapes to accommodate the exterior interface portions of the electrical circuit devices. When the electrical circuit device is securely attached to the cover plate, the exterior interface portion of the electrical circuit device extends through these openings in the cover plate to create an uninterrupted cover plate assembly. This assembly may then be attached to the outlet box to serve as an exterior front wall and thereby create an enclosed housing.

FIGS. 1 and 2 illustrate a cover plate assembly 10 of a type found in the current art. For installation according to code, electrical junction boxes (not shown) must have proper covers. Whenever an installed junction box with electrified wires fails to have a cover, this is noted as an open junction box and considered to be dangerous, since it clearly constitutes a fire or electrocution hazard.

Cover plate assembly 10 as shown includes cover plate 12. For industrial applications, cover plate 12 is typically made of metal and, in particular, steel, galvanized steel, or aluminum. In non-industrial settings, cover plates are typically formed of plastic. Cover plate 12 has a face portion 14 and a mounting portion 16. Mounting portion 16 serves to fasten cover plate 12 to the junction box. Extending between face portion 14 and mounting portion 16 are four side portions 18. Face portion 14 has a planar exterior surface 20 and a planar interior surface 22; mounting portion 16 also has a planar exterior surface 24 and a planar interior surface 26; and each side portion 18 has a planar exterior surface 28 and a planar interior surface 29. Interior surface 22,26,29 cooperate to produce a concave aspect to the interior portion of cover plate 12.

To form cover plate assembly 10, a specific electrical circuit device 30 is attached to cover plate 12. Electrical circuit device 30, as shown, is a conventional, "off-the-shelf" duplex or double outlet electrical receptacle having two standard, grounded sockets 32 as its interface members. Each grounded socket 32 is exterior to cover plate assembly 10 by extending outward through a socket aperture 34 in face portion 14 and serves as an electrical outlet for users of cover plate assembly 10.

By convention, and for some electrical circuit devices by code, electrical circuit device 30 is attached to cover plate 12 by means of at least one plate screw 36. Plate screw 36 are commonly standard threaded connecting screws of a narrow shank. Electrical circuit device 30 has two attachment tabs (also called ears) 38 at the longitudinally top and bottom ends of its housing to receive plate screws 36. Each of the two plate screws 36 extends through a face-plate screw port (not shown) and through a tab screw port (not shown) in tab 38.

Tab 38 is integrally attached to electrical circuit device 30. Electrical circuit device 30 has energizable terminals 40. It is well recognized that energizable terminals 40 may be of a screw-type (as shown) or of any other means for attaching a live, electrifiable wire to the terminal such as through a spring-loaded terminal. Electrical circuit device 30 also has ground terminal 42.

Plate screws 36 are secured by plate nuts 44. Each plate nut is preferably a machine screw nut having a major plate-nut width $w_n$. Between each plate screw 36 and the nearest side-portion inner surface 29 is clearance width $w_c$. For a variety of reasons, including the cost of materials of production and the unintrusive, aesthetic nature of the finished installation, cover plate 12 is configured to have minimal facial area. To accomplish this, cover plate 12 is provided with side portions 18 that are narrowly spaced apart from tabs 38 when the exterior interface portions or sockets 32 of the electrical circuit device 30 are positioned within socket apertures 34. As a result, there is little clearance available for threading plate nuts 44 to plate screws 36. In typical installations of this type in accordance with the current art, $w_n$ is about ¼ in. and $w_c$ is about 3/16 in. Moreover, side-portion inner surface 29 has a depth dimension $d_{sp}$ of about ½ in.

Given the depth dimension $d_{sp}$ of side-portion inner surface 29 and the tight dimensioning of nut width $w_n$ within clearance width $w_c$, the assembly of electrical circuit device 30 to cover plate 12 requires the assembler to not only hold electrical circuit device 30 in proximity to cover plate 12, but that he also simultaneously hold nut 44 with his fingers against tab 38 in alignment with the tab screw port while inserting a plate screw 36 through face-plate screw port and tab screw port so that it can be threaded through nut 44. Due to the dimensions of these components, such an assembly is difficult at best and will always be very time consuming. Industrial and commercial construction across the country require dozens, if not hundreds, of these assemblies at each site. Since electricians at all experience levels are usually paid at an hourly rate, the cost for assembling these cover plate assemblies 10 in the course of any electrification wiring job can be quite high.

A quick connection between a conventional electrical circuit device and a cover plate that facilitates easy and secure attachment thereto without the use of additional fasteners or modification to the circuit device itself would therefore constitute an important advancement for industrial and commercial electrical installations. The time saved when multiplied by the thousands of units installed each year equates to a substantial cost savings in addition to significant increases in overall productivity.

OBJECTS OF THE INVENTION

It is a primary object of this invention to provide an improved cover plate that overcomes some of the problems and shortcomings of the prior art.

Another object of this invention is to provide a novel cover plate that can be quickly and easily secured to a conventional electrical circuit device.

Another object of this invention is to provide an exceptional cover plate that can be attached to a generic electrical circuit device in a single-handed manner without the need for additional fasteners.

Another object of this invention is to provide an excellent cover plate that is readily customizable to a variety of common electrical circuit devices.

Still another object of this invention is to provide a desirable cover plate that can be easily installed to electrical circuit devices for overhead installations.

Yet another object of this invention is to provide a novel cover plate that is simple to construct, highly reliable to use in assembly with electrical circuit devices, and easy to maintain.

SUMMARY OF THE INVENTION

One aspect of this invention is for a cover plate assembly for use in mounting an electrical circuit device to an electrical outlet box. The assembly includes at least one electrical circuit device with at least one rigid attachment member and a cover plate with a locking member that slidably receives and substantially restrains the attachment member to fully secure the electrical circuit device to the cover plate utilizing only the locking member. The electrical circuit device is provided with a housing to which the attachment member is mounted. The attachment member is coplanar with the anterior face of the housing and is configured to enable the electrical device to be mounted directly to the electrical outlet box. The cover plate has a body with a rear surface to which the locking member is rigidly mounted.

The term "electrical circuit device" as used throughout this application refers to conventional electrical devices of the type having a body or housing with energizable terminals. Such generic and common electrical devices are available off-the-shelf from nearly all electrical supply stores and include at least one but preferably two attachment members referred to as "ears" or tabs at its top and bottom. These tabs are structures that are coplanar with the anterior face (i.e., front wall) of the device's housing. The terminals permit an electrical connection to be made to the wiring in the outlet box from the circuit or conduit. The attachment-tabs conventionally enable the electrical circuit device to be mounted by separate fasteners to either the electrical outlet box or within a cover plate to the outlet box as described above. Such electrical devices also include at least one interface member extending outward from the anterior face of the housing. After assembly to the outlet box, this interface member of the device is found positioned exterior to the outlet box housing to provide the means for users to engage or access the device. These electrical circuit devices include, but are not limited to, both switches and such socket receptacles as duplex socket outlets, GFCI (ground fault circuit interrupter) outlets, and even single circular outlets intended for 15/20/30A, 250V service.

In certain exceptional embodiments, the attachment member is a substantially planar attachment-tab having a tab-outer edge defined by its front and rear sides. In addition, the cover plate includes a front wall along with a side wall extending outward from the cover-outer edge of the front wall. The locking member in these embodiments has first and second panels where each panel is flexibly resilient and rigidly mounted to the interior surface of the side wall. The term "flexibly resilient" as used herein refers to the ability of the panels to elastically recover their original configuration after undergoing non-destructive force-induced flexing when that force is withdrawn.

The first panel is spaced apart from the second panel by an opening-distance that allows each panel to make contact with the outer edge of the attachment-tab when it is inserted into the locking member. The term "opening-distance" as used herein refers to the shortest distance between the two adjacent panels in their non-flexed or closed configuration within a plane parallel to the back face of the front wall.

More desirable is where each panel has a distal portion with an inner surface extending from the upper edge of the panel to its lower edge. The first inner surface is in registry with and faces the second inner surface. Each of the inner surfaces is beveled so that, in proceeding downwards from the upper edge to the lower edge, it slopes outwards from the panel. As a result, the opening-distance between the two panels is greatest between the first upper edge and the second upper edge. In addition, the first lower edge and the second lower edge are spaced above the back face of the front wall by a retention-distance substantially equal to the depth of the tab-outer edge to snugly restrain the attachment-tab beneath the lower edges when the attachment-tab is advanced through the locking member. The term "snugly" as used herein means that the retention-distance is only slightly greater than the depth of the tab-outer edge so that the attachment-tab nestles (i.e., fits frictionally close) beneath the lower edges of the panels.

A most preferred embodiment finds the side wall having top and bottom sections and the locking member including top and bottom locking sets. The top locking set has first and second top panels mounted to the interior surface of the top section and the bottom locking set has first and second bottom panels mounted to the interior surface of the bottom section with both locking sets being integral with the body to form a monolithic cover plate. Highly preferred is where the top panels are in registry with the bottom panels.

One desirable embodiment has a double outlet electrical receptacle as the electrical circuit device with rigid attachment-tabs upon the top and bottom of its housing. The receptacle also includes first and second socket projections extending outward from its anterior face. In this embodiment, the front wall has first and second socket-apertures that are each sized to snugly receive at least one of the socket projections. The term "snugly" as used herein means that each of the apertures defines an opening that is only slightly larger than the size of each socket projection so that while each socket projection may freely enter its respective socket-aperture longitudinally, the socket projection is not free to move substantially lateral once within the socket-aperture due to the close fit. Moreover, the locking sets and the socket-apertures are positioned upon the cover plate so that not only is each attachment-tab secured by one of the locking sets, but each socket projection is in registry with one of the socket-apertures.

In certain exceptional embodiments, the assembly includes at least two electrical circuit devices, each of the devices having rigid attachment-tabs on its top and bottom. Each locking set comprises at least a first and a second locking unit. Each of these units has first and second panels. The top and bottom locking units are positioned upon the cover plate so that the top locking units are in registry with the bottom locking units and both electrical circuit devices are fully secured to the cover plate by having each attachment-tab secured by one of the locking units.

Most desirable is where the two electrical circuit devices are a double outlet electrical receptacle and a switch assembly. The front wall of the cover plate is provided with two socket-apertures sized to snugly receive the socket projections of the electrical receptacle and a toggle-aperture sized to snugly receive the toggle-bar upon the switch assembly. The locking sets, socket-apertures and toggle-aperture are located upon the cover plate in positions where each socket projection is in registry with one of the socket-apertures and the toggle-bar is in registry with the toggle-aperture when these electrical circuit devices are secured to the cover plate.

Another preferred embodiment is where each locking set comprise at least one intermediate panel and two outer panels. Each intermediate panel has two opposing intermediate inner surfaces and is positioned between the outer panels. Each of the panels in each locking set is spaced equidistantly from any panel in the set that is adjacent to it. Moreover, the inner surface upon any of the panels in a locking set faces an inner surface upon an adjacent panel resulting in the opening-distance between adjacent panels being greatest between adjacent upper edges.

More preferred is where the assembly includes at least two electrical circuit devices and the locking sets secure the devices to the cover plate by being placed where each of the attachment-tabs upon these devices are secured by two panels that are adjacent to each other.

An embodiment that is quite desirable finds the electrical circuit device being chosen from two electrical circuit devices that each have a substantially circular socket projection extending outward from its anterior face. The first circuit device has a socket projection with a diameter that is greater than the diameter of the socket projection upon the second circuit device. In this embodiment, the cover plate to the assembly has a substantially circular socket-aperture sized to snugly receive the socket projection of the first circuit device. The assembly also includes an adapter ring with an interior opening sized to snugly receive the socket projection of the second circuit device. The adapter ring is configured not only to be slidably received within the socket-aperture of the cover plate but to also be capable of being removed from that aperture. The cover plate can therefore be used to form either a first assembly with the first electrical circuit device by removing the adapter ring from the cover plate or to form a second assembly by choosing the second electrical circuit device and mounting the adapter ring to the cover plate within the socket-aperture.

Highly desirable is where the adapter ring includes an outer flange and the cover plate includes an inner recessed rim circumscribing the socket-aperture. The rim is configured to receive and support the flange when the adapter ring is mounted onto the cover plate.

Another exceptional embodiment of this assembly finds the cover plate being polymeric and having at least one fastener-channel located upon it to be in registry with a fastener-aperture upon the electrical outlet box. This fastener-channel has front and rear openings and flexibly resilient flaps circumscribing the rear opening. The flaps configure the rear opening so that it is variably narrower than the front opening. As a result, a fastener that is inserted through the fastener-channel will be held in position within the channel by these flaps even thought the fastener has yet to engage the fastener-aperture.

Another aspect of this invention is a method for installing an electrical circuit device to an electrical outlet box where the electrical circuit device is the conventional type having a housing and at least one rigid attachment member mounted to the housing. Each attachment member upon the electrical circuit device is coplanar with the anterior face of the housing and is configured for mounting such a device to the electrical outlet box. The method includes the steps of providing a cover plate with a flexibly resilient locking member that is rigidly mounted to its rear surface, of forming a cover plate assembly that fully secures the circuit device to the cover plate by only slidably inserting each attachment member into the locking member, of connecting electrical wiring from within the electrical outlet box to the circuit device, and of mounting the cover plate assembly to the electrical outlet box.

Most desirable is where there are at least top and bottom attachment-tabs and each attachment-tab is substantially planar with a tab-outer edge defined by its front and rear sides. The cover plate includes a front wall and a side wall extending outward from the cover-outer edge of the front wall. The locking member has top and bottom locking sets where the top locking set is provided with first and second top panels rigidly mounted to the interior surface of the top section of the side wall and the bottom locking set includes first and second bottom panels rigidly mounted to the interior surface of the side wall's bottom section. Each first panel is spaced apart from the corresponding second panel adjacent to it and the top panels are in registry with the bottom panels. In this embodiment, each panel has a distal portion with an inner surface that is beveled so that it slopes outward from the panel in proceeding downwards from the upper edge to the lower edge. The distance of the opening between adjacent panels is therefore greatest between their upper edges and the distance between the lower edges is less than the width of an attachment-tab. The inner surface on each panel is in registry with and faces the inner surface upon the panel adjacent to it. Moreover, the lower edges are spaced above the back face by a distance that is substantially equal to the depth of the tab-outer edge so that each attachment-tab is snugly restrained beneath these lower edges when the attachment-tab is inserted into one of the locking sets.

A highly preferred embodiment is where the forming step of the method includes the steps of placing the top attachment-tab between the upper edges of the top panels in their closed position and of applying pressure upon this attachment-tab in the direction of the back face so that the tab-outer edge is brought into contact with the inner surfaces of these top panels to flexibly spread the panels further apart and place them in their open position. This embodiment also includes the step of advancing the top attachment-tab between the top panels while they are in the open position until the attachment-tab is propelled past the lower edges of the panels. With the force being exerted by the attachment-tab now removed from the top panels, they resiliently return to their original closed position, thereby securing the top attachment-tab between the back face of the cover plate on the front side and the panels' lower edges on the rear side. The placing, applying and advancing steps are also performed with respect to the bottom attachment-tab which is inserted between the bottom panels.

One other aspect of this invention is directed to a cover plate for an electrical outlet box. The cover plate is configured for engaging a conventional electrical circuit device of the type that has both a housing and at least one rigid attachment member mounted to that housing, the attachment member being in an orientation that is coplanar with the housing's anterior (i.e., front) face. This attachment member is present upon the housing as a means of enabling the circuit device to be mounted directly to the outlet box using fasteners such as threaded bolts or screws. The cover plate comprises a body having a rear surface and a locking member rigidly mounted to that rear surface wherein the locking member is configured to slidably receive and substantially restrain the attachment member to fully secure the circuit device to the cover plate utilizing only the locking member.

Most preferred is where the locking member includes at least two flexibly resilient panels, the first panel being spaced apart from the second panel by an opening-distance that ensures that each panel is contacted by the outer edge of the attachment-tab when it is inserted into this locking member. More desirable is where the first and second panels are integral with the body to form a monolithic cover plate.

A highly preferred embodiment finds the cover plate having a front wall and a side wall extending outward from the cover-outer edge of the front wall. In these embodiments, the rear surface of the cover plate includes the interior surface of the side wall and the first and second panels are rigidly mounted to this interior surface.

Certain other desirable embodiments find at least one panel spaced above the back face of the cover plate by a retention-distance substantially equal to the depth of the outer edge of the attachment-tab to allow the attachment-tab to be snugly restrained beneath the locking member when it is inserted through the locking member.

More desirable is where the first panel has a first inner surface, a first upper edge and a first lower edge and the second panel has a second inner surface, a second upper edge and a second lower edge. Moreover, with the first inner surface facing the second inner surface, both inner surfaces are beveled such that each inner surface slopes outward along a line from that panel's upper edge to its lower edge, resulting in the distance of the opening between the first and second panels being greatest between the first upper edge and the second upper edge. Most desirable is where each panel has a distal portion and each inner surface is beveled only along that distal portion.

Another embodiment that is much preferred finds the cover plate having a side wall with top and bottom sections and the locking member includes top and bottom locking sets. The top locking set has first and second panels mounted to the interior surface of the top section and the bottom locking set also has first and second panels mounted to the interior surface of the bottom section. Moreover, each of the panels of the top locking set are in registry with the respective panels comprising the bottom locking set.

Most preferred is where each locking set comprises at least first and second locking units. Each of these locking units includes first and second panels and the locking units of the top locking set are in registry with the locking units of the bottom locking set. The first top and bottom locking units are positioned to slidably receive and restrain the top and bottom attachment-tabs respectively upon a electrical circuit device. Likewise, the second top and bottom locking units are positioned to slidably receive and restrain the top and bottom attachment-tabs upon another electrical circuit device. In this manner, both electrical circuit devices are fully secured to the cover plate. Highly preferred is where each panel of the locking member also includes a proximal edge abutting the side wall of the cover plate such that the proximal edge and the upper edge of each panel are in a plane orthogonal to the back face.

BRIEF DESCRIPTION OF THE DRAWINGS

FIG. 13A is a fragmentary front perspective view of another preferred cover plate assembly in accordance with this invention utilizing the cover plate in FIG. 11.

FIG. 13B is a fragmentary front perspective view of the cover plate assembly in FIG. 12.

DETAILED DESCRIPTION OF PREFERRED EMBODIMENTS

FIGS. 3-13B illustrate preferred embodiments of an improved cover plate to which a conventional electrical circuit device is attached to form a cover plate assembly in accordance with this invention. Identical reference numbers refer to similar features throughout this description. Cover plate and circuit device are quickly and easily assembled together without the need for the application of any adhesive such as glue or the use of any fasteners such as threaded screws and nuts to hold them.

Figure 3:
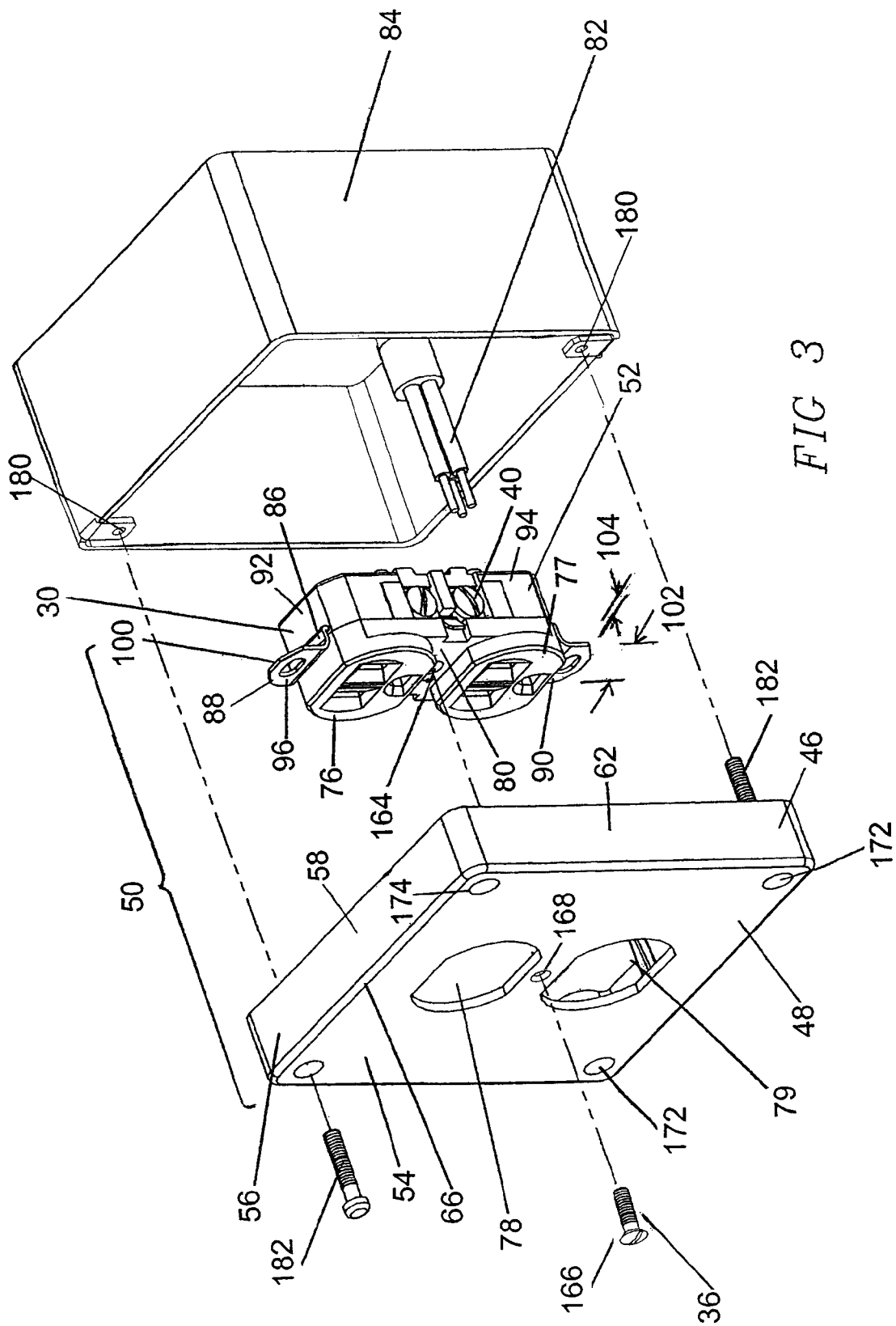
FIG. 3 is a front exploded view of a preferred cover plate assembly in accordance with this invention.
Figure 4:
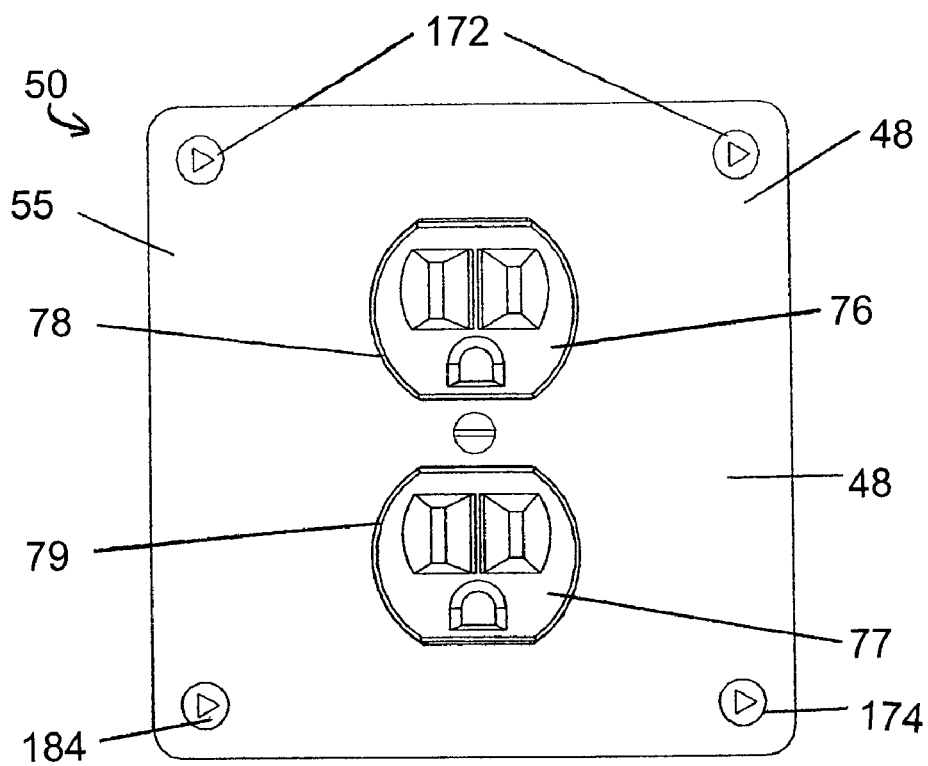
FIG. 4 is a front view of the cover plate assembly in FIG. 3.
Figure 5:
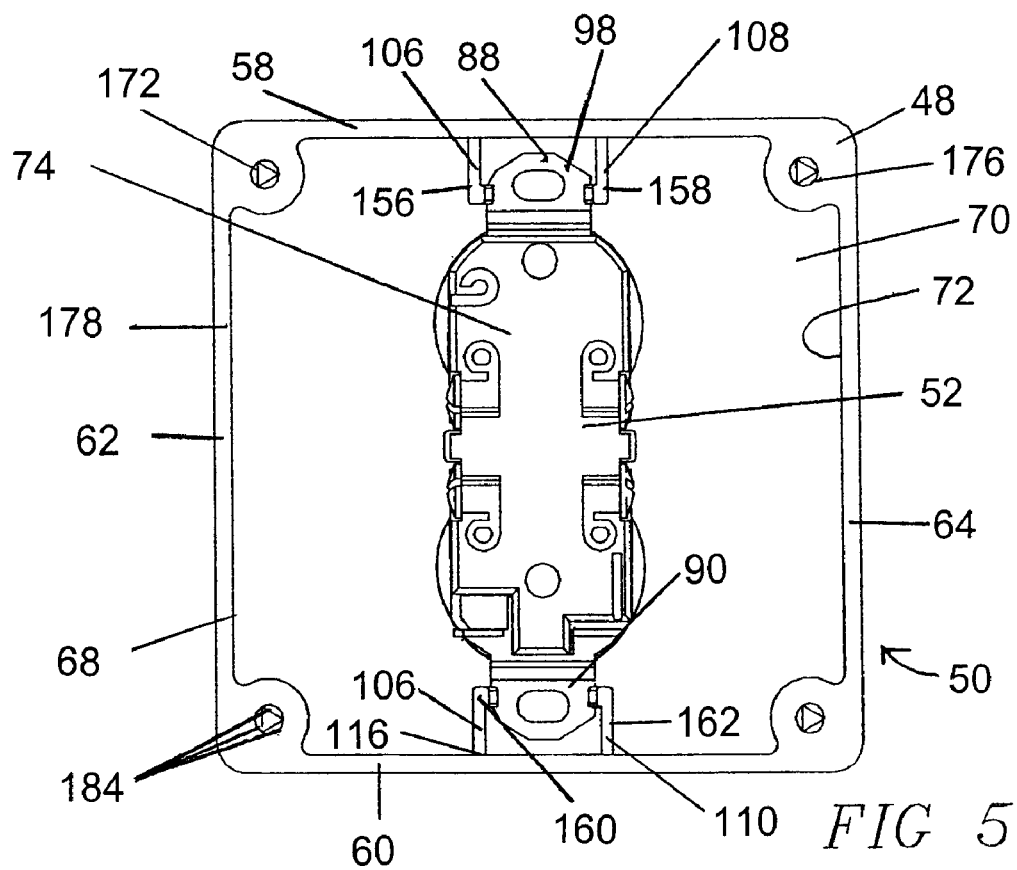
FIG. 5 is a rear view of the cover plate assembly in FIG. 3.

One embodiment is cover plate assembly 50 as shown in FIGS. 3-5. Cover plate assembly 50 has a cover plate 48 and a double outlet electrical receptacle 52 as the electrical circuit device 30 engaged to cover plate 48. While cover plate 48 can be made from a flexibly resilient metal, it is more preferably a monolithic structure that has been fabricated from a polymeric material with the desired flexibility, strength and flame resistence. In addition to these properties, the choice of polymeric material will depend as well upon the particular application being made of the cover plate, the costs of production and the projected weight of the completed assembly. One highly desirable polymeric material for cover plate 48 is a high flow polyvinyl chloride (PVC) compound such as HF-6597 from Georgia Gulf. The desired fabrication of cover plate 48 can be achieved using either an extrusion or molding process. One skilled in the art will readily recognize, however, that a variety of other fabrication procedures can also be used.

Cover plate 48 has a body 46 with a rectangular planar front wall 54 and a side wall 56 comprised of four planar side sections 58,60,62,64. Side wall 56 extends orthogonally rearward along the perimeter or cover-outer edge 66 of front wall 54. The outside dimensions of front wall 54 are preferably about 4.0625 in. by 4.0625 in. Side sections 58,60,62,64 each have preferably a width of about 0.6875 in. and a thickness of about 0.08 in.

The rear surface 68 of cover plate 48 includes the back face (also known as rear side) 70 of front wall 54 and the interior surface 72 of each side section 58,60,62,64 adjacent to back face 70. Top section 58 of side wall 56 is positioned at the upper end of cover plate 48. Bottom section 60, on the other hand, is opposite to top section 58 at the lower end of cover plate 48. As used throughout this application, the terms "upper", "lower", "top" and "bottom" provide relative positioning along a suggested vertical dimension with respect to a horizontal plane. These terms are used herein for ease in discussing certain embodiments of the present invention depicted in the drawings. In particular, cover plate 48 is depicted in FIGS. 3-5 with an orientation where side sections 62,64 are substantially vertical to the plane of the ground and top and bottom sections 58,60 are substantially horizontal to the ground. One skilled in the art will readily recognize, however, that the cover plates and cover plate assemblies illustrated and described herein can be used in any orientation.

Double outlet electrical receptacle 52 is a duplex socket electrical device having a housing 74 with first and second socket-projections 76,77 extending outward from its anterior face 80. Front wall 54 is provided with first and second socket-apertures 78,79 that are double D-shaped and have the specific dimensions that allow them to snugly receive first and second socket-projections 76,78 when cover plate assembly 50 is fully assembled. Each socket-projection 76,78 extends outward through one of the socket-apertures 78,79 to be exterior to cover plate assembly 50, serving as an electrical outlet for users of electrical receptacle 52. Electrical receptacle 52 also includes terminals 40,42, as previously described, that are utilized for engaging electrical receptacle 52 to the electrical wiring 82 present within electrical outlet box 84 in a manner well-known to those skilled in the art.

Figure 1:
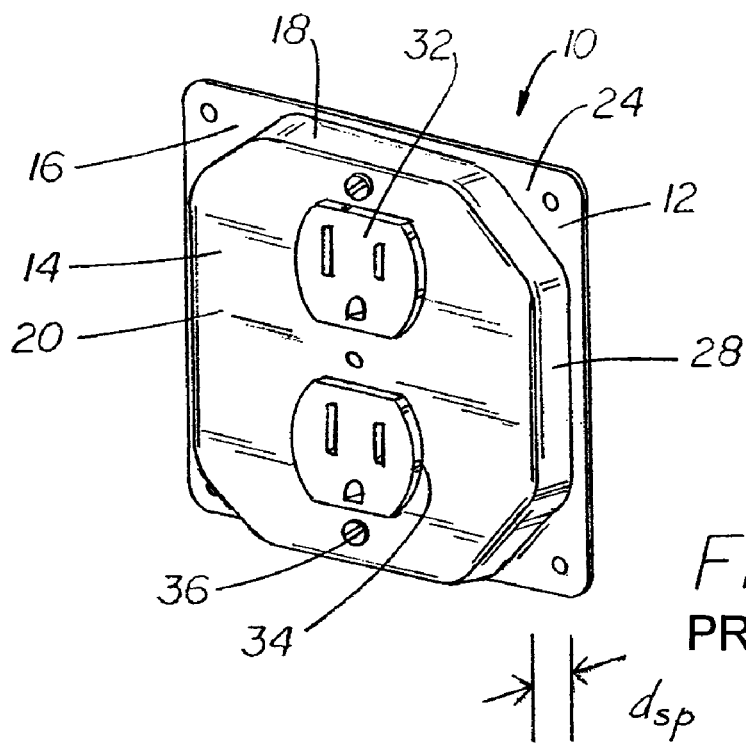
FIG. 1 is a front perspective view of a cover plate assembly in the prior art.
Figure 2:
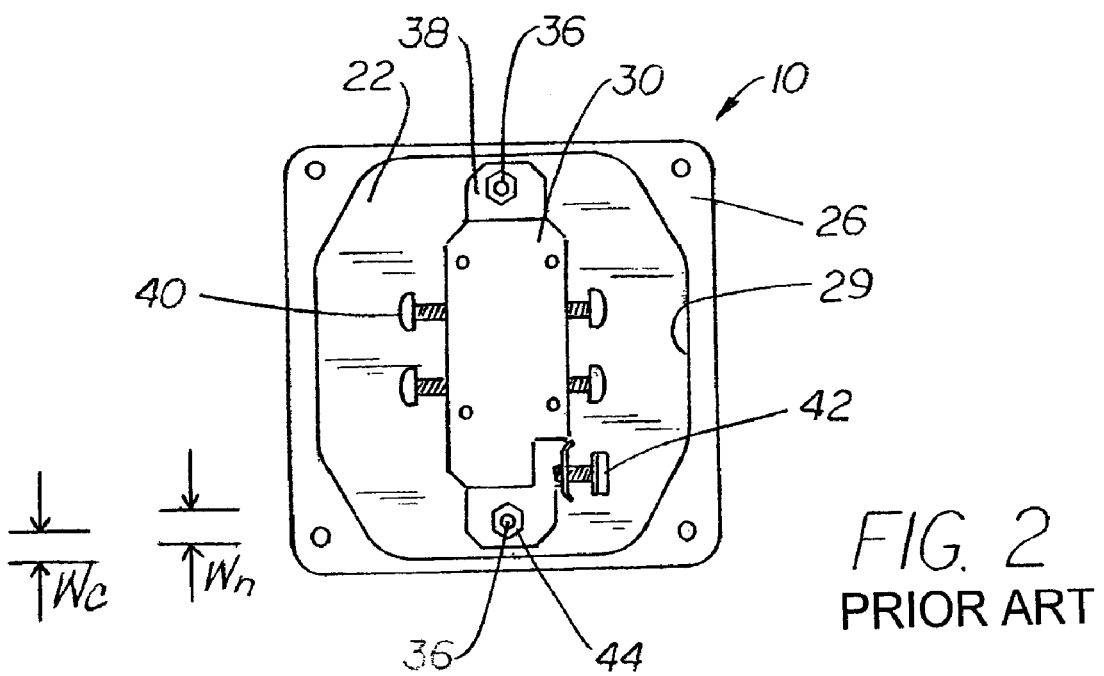
FIG. 2 is a rear view of the cover plate assembly in FIG. 1.

Electrical receptacle 52 is provided with an attachment member 86 that is customarily used to mount such an electrical circuit device to either an electrical outlet box 84 or to a conventional cover plate 12 as shown in FIGS. 1-2. FIG. 3 illustrates that attachment member 86 is comprised of top and bottom attachment-tabs 88,90 integrally attached respectively to the top and bottom ends 92,94 of housing 74. Each attachment-tab 88,90 is substantially coplanar with anterior face 80. Each attachment-tab 88,90 has front and rear sides 96,98 with a tab-outer edge 100 defined by the junction between the two sides 96,98. Each attachment-tab 88,90 are preferably substantially identical in configuration; each side 96,98 has a tab-width 102 at its widest, horizontal span and each tab-outer edge 100 has a substantially uniform depth 104.

As seen in FIG. 5, cover plate 48 is provided with locking member 106 for engaging and securing electrical receptacle 52 within cover plate 48. Locking member 106 is comprised of top and bottom locking sets 108,110. Each locking set 108,110 includes first panel 112 and second panel 114. Top locking set 108 is integral with interior surface 72 of top section 58. Likewise, bottom locking set 110 is integral with interior surface 72 of bottom section 60. Each panel 112,114 has a proximal edge 116 along which each panel 112,114 abuts and is joined to the side section 58,60 to which it is attached.

Figure 6:
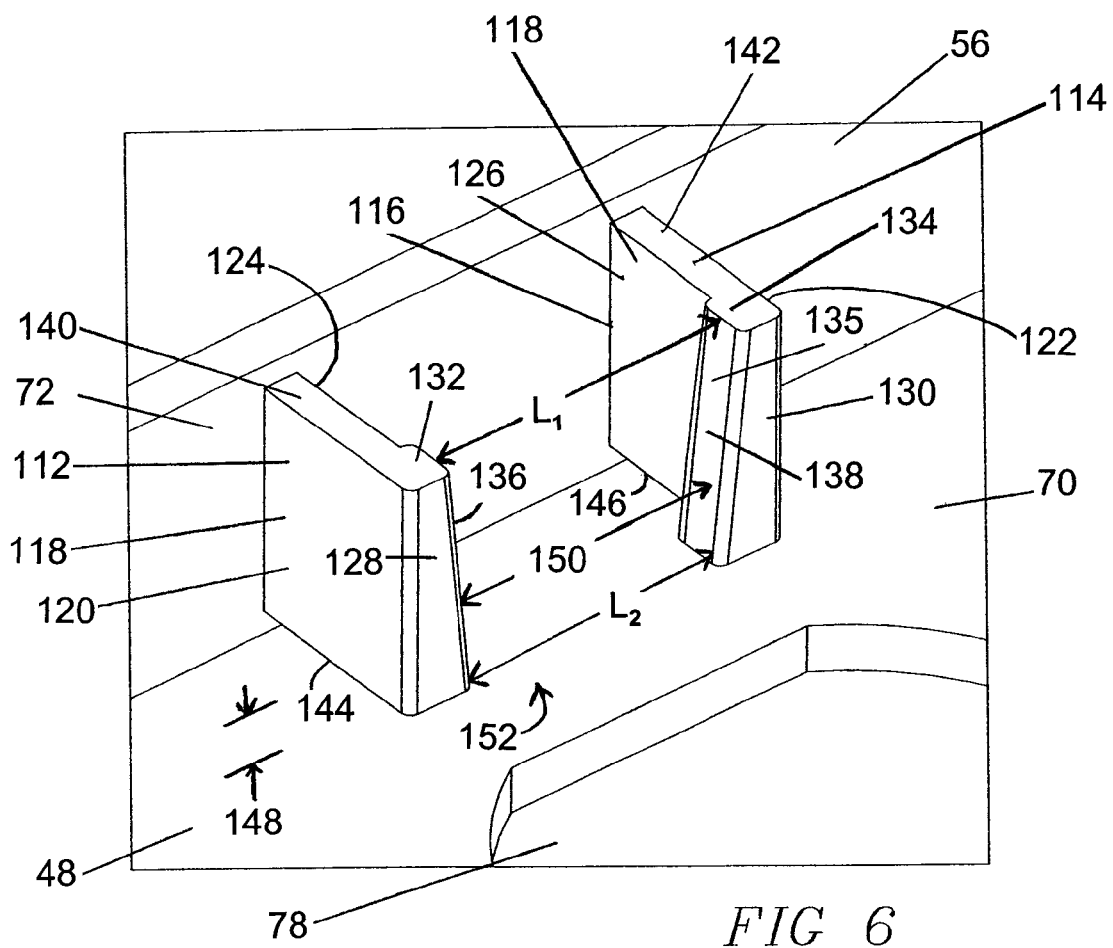
FIG. 6 is a fragmentary rear perspective view of the cover plate in FIG. 3 illustrating one of the locking sets.

FIG. 6 illustrates how each panel 112,114 is comprised of a substantially planar panel-wall 118 extending orthogonally outward from side wall 56. Panel-wall 118 is constructed to have a thickness between outer side 120,122 and inner side 124,126 that is sufficient to provide panels 112,114 with the desired flexible resilience. Such thickness for panel-wall 118 is preferably in the range of about 0.07 to 0.08 in. The flexible resilience of panels 112,114 enables them to serve as snapping posts for receiving and securing the attachment-tabs 88,90 on electrical receptacle 52 in a manner more fully explained below.

Figure 7A:
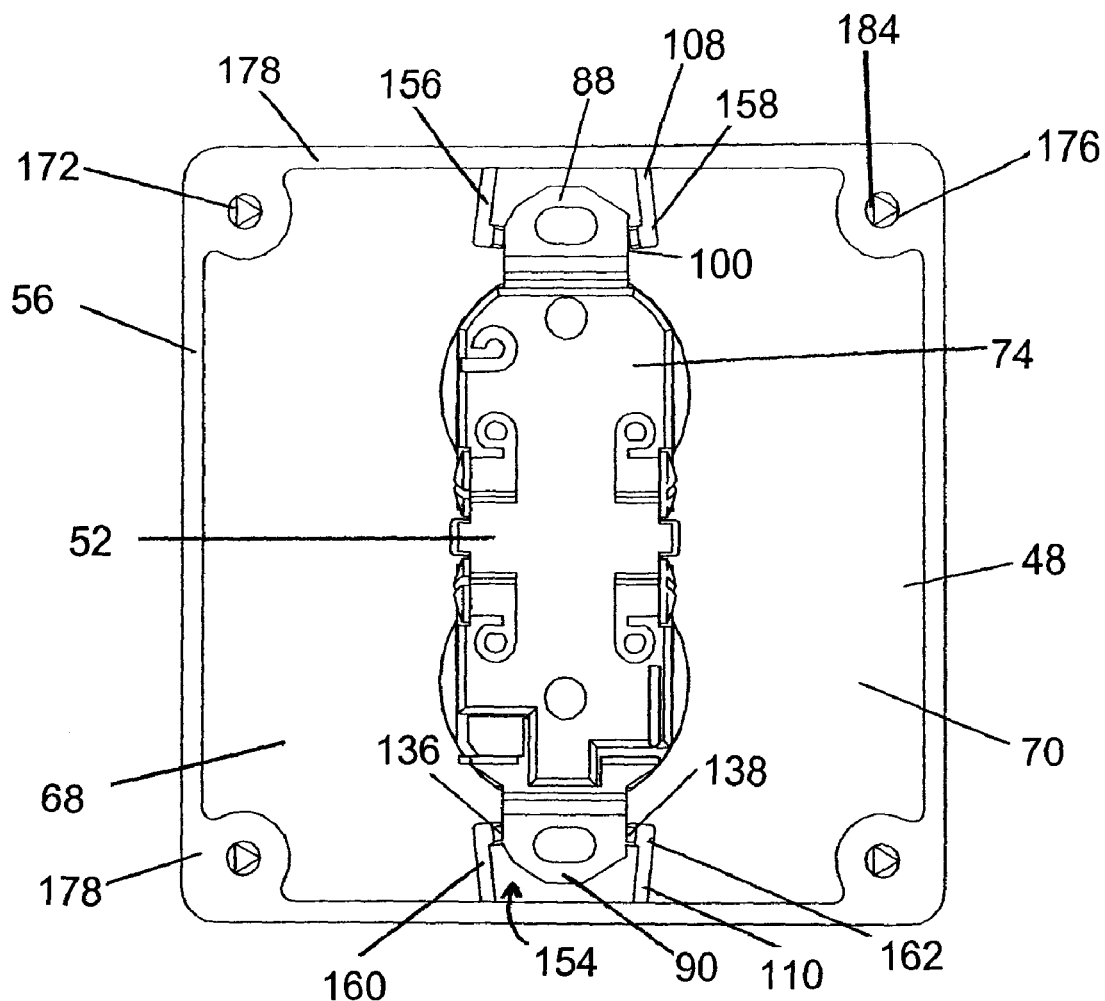
FIG. 7A is a rear view of the cover plate assembly in FIG. 3 illustrating engagement of the electrical circuit device with the cover plate with the locking sets in the open position.
Figure 7B:
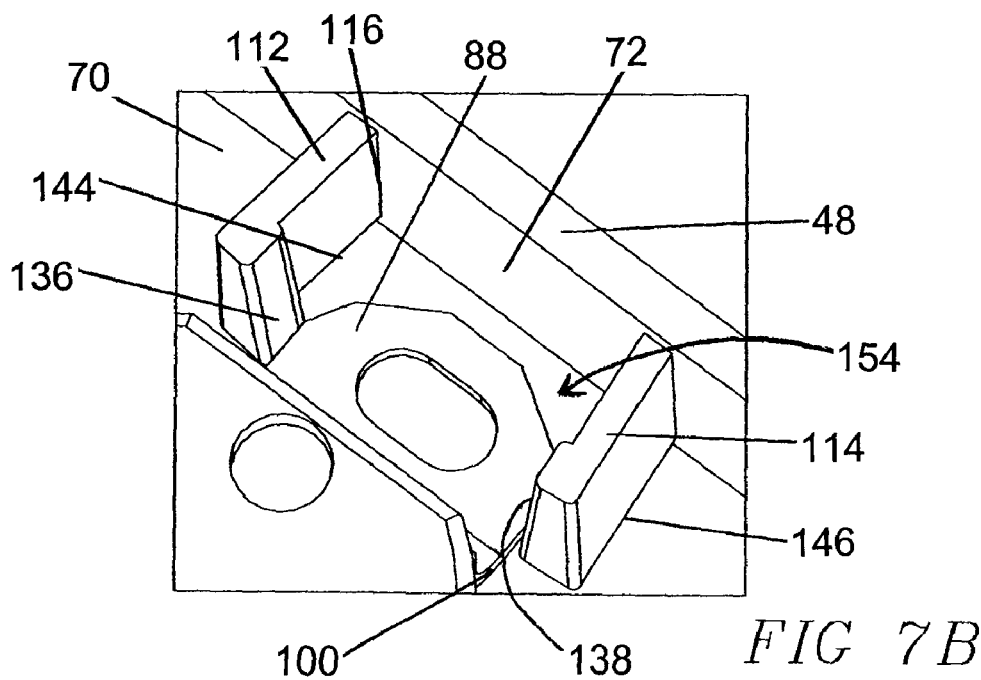
FIG. 7B is a fragmentary rear perspective view of the cover plate assembly in FIG. 7A illustrating one of the locking sets in the open position.

The distal portion 128,130 of panel-wall 118 on each panel 112,114 is provided with a projection 132,134 protruding orthogonally outward from panel-wall 118. At the distal end 135 of each projection 132,134 is an inner surface 136,138 extending from the upper edge 140,142 to the lower edge 144,146 of the respective panel 112,114. One will note that panels 112,114 are depicted in FIGS. 6,7B as being substantially vertical with respect to the plane of back face 70 to orient "upper" from "lower."

As seen in FIGS. 5-6, first projection 132 and thereby first inner surface 136 faces and is in registry with second inner surface 138 of second projection 134. Upper edges 140,142 are substantially coplanar and parallel with back face 70. Lower edges 144,146 lie likewise in a plane that is substantially parallel with back face 70. Upper edges 140,142 and proximal edge 116 lie in a plane orthogonal to back face 70. Lower edges 144,146 and thereby panels 112,114 are spaced away from back face 70 by retention-distance 148.

Each inner surface 136,138 is at a beveled incline, sloping outwards from panel-wall 118 towards the adjacent panel 114,112 as it proceeds downwards towards back face 70 from upper edge 140,142 to lower edge 144,146. The slope of each inner surface 136,138 is such that the opening-distance 150 between first inner surface 136 and second inner surface 138 in their closed position 152, as measured along the shortest distance between those surfaces 136,138 in a plane parallel with back face 70, will vary depending upon the distance of that plane from back face 70. In particular, opening-distance 150 between inner surfaces 136,138 is greatest between upper edges 140,142. In proceeding downwards towards back face 70, opening-distance 150 decreases until reaching its smallest value between lower edges 144,146 for the closest distance between first inner surface 136 and second inner surface 138. As shown in FIG. 6, first panel 112 is spaced apart or separated from second panel 114 by opening-distance $L_1$ as measured at the respective upper edges 140,142, an opening-distance 150 that is larger than the opening-distance $L_2$ measured between panels 112,114 at their respective lower edges 144,146.

The lengths of opening-distances $L_1$, $L_2$ are configured and arranged so that $L_1$ is preferably slightly greater than or equal to tab-width 102 of each attachment-tab 88,90 and $L_2$ is slightly less than tab-width 102. Since panels 112,114 are integral with cover plate 48 only along their proximal edge 116 at interior surface 72, panels 112,114 (and thereby first distal portion 128 and second distal portion 130) are capable of lateral flexion away from and toward each other. In certain preferred embodiments of cover plate 48, each panel 112,114 has a length outward from side wall 56 of about 0.40625 in., a height from upper edge 140,142 to lower edge 144,146 of about 0.4375 in. with a retention-distance 148 of about 0.09375 in., and lengths of opening-distances $L_1$, $L_2$ of about 0.78125 in. and 0.5625 in. respectively.

In assembling cover plate assembly 50, electrical receptacle 52 is snapped into engagement with cover plate 48 by hand without the need for tools or additional fasteners. Top attachment-tab 88 is first brought into contact with panels 112,114 of top locking set 108 in their non-flexed or closed position 152, the position shown in FIG. 6. Attachment-tab 88 is then oriented so that it is parallel to back face 70 of cover plate 48 so that tab-outer edge 100 abuts and is in contact with first and second inner surfaces 136,138 at or just beneath upper edges 140,142. Afterwards, as illustrated in FIGS. 7A-7B, top attachment-tab 88 is urged downward along inner surfaces 136,138 of projections 132,134 towards back face 70. As attachment-tab 88 moves downward to where the opening-distance 150 between inner surfaces 136,138 decreases, panels 112,114 are flexibly forced apart by attachment-tab 88 into an open position 154, thereby increasing the separation between projections 132,134. In this manner, attachment-tab 88 is allowed to pass between panels 112,114 of top locking set 108.

Each attachment-tab 88,90 has a tab depth 104 that is slightly less than retention-distance 148 beneath each locking set 108,110. This allows top attachment-tab 88 to pass beyond lower edges 144,146 of panels 112,114 so that front side 96 of attachment-tab 88 may abut and make contact with back face 70 without further contact between attachment-tab 88 and inner surfaces 136,138. It also allows lower edges 144,146 to preferably make contact with rear side 98 of attachment-tab 88 so that attachment-tab 88 is pressed by lower edges 144, 146 against back face 70. Engagement of lower edges 144, 146 with rear side 98 can be enhanced by providing lower edges 144,146 with a beveled surface that slopes inward towards back face 70 as the surface proceeds from inner surfaces 136,138 to outer sides 120,122.

Absent contact with attachment-tab 88 forcing inner surfaces 136,138 apart, the resiliency of panels 112,114 results in each panel 112,114 snapping back to the closed position 152 so that the panels return to their original, non-flexed configuration. As panels 112,114 return to their closed configuration, the slope of lower edges 144,146 enable panels 112,114 to better grip attachment-tab 88 over a range of tab depths 104.

The above described process is then repeated by engaging bottom attachment-tab 90 with bottom locking set 110. One skilled in the art will readily recognize that, in many instances, both attachment-tabs 88,90 can be inserted simultaneously into top and bottom locking sets 108,110 of locking member 106. First and second socket-apertures 78,79 are located upon front wall 54 of cover plate 48 to be in registry with first and second socket-projections 76,77 so that both socket-projections 76,77 are received by socket-apertures 78,79 when electrical receptacle 52 is held against back face 70 by locking member 106.

In this manner, as shown in FIG. 5, lower edges 144,146 of top panels 156,158 hold top attachment-tab 88 in fixed position against back face 70 and lower edges 144,146 of bottom panels 160,162 hold bottom attachment-tab 90 similarly in fixed position against back face 70 to fully engage electrical receptacle 52 within cover plate 48. When each pair of panels in the top and bottom locking sets 108,110 return to their closed position 152 with a separation of opening-distance $L_2$, lower edges 144,146 inhibit attachment-tabs 88,90 from returning upward along inner surfaces 136,138 towards upper edges 140,142 to thereby free electrical receptacle 52 from engagement with cover plate 48. Given the sizing and flexion properties of panels 112,114, locking member 106 successfully retains an electrical circuit device 30 such as a duplex socket electrical receptacle 52 in a fixed and secure engagement with respect to cover plate 48.

In another embodiment of cover plate 48 in accordance with this invention, bottom locking set 110 can be substituted with an arch or bracket (not shown) integrally formed as part of cover plate 48 and is positioned immediately adjacent to bottom section 60 of side wall 56. This bracket is mounted upon back face 70, extending rearward from back face 70. The bracket defines a slot sized to receive bottom attachment-tab 90 into which bottom attachment-tab 90 is slid for securing bottom attachment-tab 90 to cover plate 48. Top attachment-tab 88 is then inserted into top panels 156,158 of top locking set 108 in the manner described above to form cover plate assembly 50.

While cover plate assembly 50 provides for electrical circuit device 30 to be firmly mounted within cover plate 48 by having both attachment-tabs 88,90 restrained by opposing locking sets 108,110 and socket-projections 76,77 received within socket-apertures 78,79, certain electrical circuit devices 30 such as duplex socket electrical receptacles 52 are still required by the National Electrical Code published by the National Fire Protection Association to be additionally attached to cover plate 48 by means of at least one screw. As shown in FIG. 3, electrical receptacles 52 are typically manufactured with a threaded receiving-hole 164 located between the two socket-projections 76,77 to threadably engage such a restraining screw 166, preferably a plate screw 36. Cover plate 48 has a restraining-screw aperture 168 that is complimentary in location to receiving-hole 164 of electrical receptacle 52 as shown by a dashed line in FIG. 3. Restraining screw 166 is then introduced into restraining-screw aperture 168 and extended through cover plate 48 into threaded engagement with receiving-hole 164 in electrical receptacle 52.

One skilled in the art will readily recognize that utilization of restraining screw 166 is not required to accomplish solid engagement between electrical circuit device 30 and cover plate 48 but is resorted to only for satisfying the aforementioned currently-enforced electrical code regulations. Moreover, the use of a fastener such as plate screw 36, in the absence of locking member 106 on cover plate 48, would fail to rigidly mount electrical circuit devices 30 such as electrical receptacle 52 to cover plate 48 for achieving a fully secure cover plate assembly 50.

Fastener-channels 172 positioned at the four corners of cover plate 48 are used to mount cover plate assembly 50 to an electrical outlet box (also called junction box) 84. As seen in FIGS. 3-5, each fastener-channel 172 extends through side wall 56 from front opening 174 upon front wall 54 to rear opening 176 along the rear edge 178 of side wall 56. Fastener-channels 172 are located upon cover plate 48 so that at least two are in registry with the corresponding fastener-apertures 180 upon electrical outlet box 84 as is illustrated with dashed lines in FIG. 3.

The cross-sectional diameter of each fastener-channel 172 is dimensioned so that fastener-channel 172 is sized to receive fastener 182. Fasteners 182 are guided by fastener-channels 172 into each respective fastener-aperture 180 for threadably engaging cover plate assembly 50 to electrical outlet box 84. As illustrated in FIGS. 4-5, each fastener-channel 172 is provided with flexibly resilient flaps 184 integrally formed within fastener-channel 172 and located adjacent to rear opening 176. Flaps 184 are preferably three thin polymeric pieces that are formed at one end of each fastener-channel 172, extending radially inward to define a triangular spacing within fastener-channel 172.

Flaps 184 serve to provide fastener-channel 172 with one region along the longitudinal length of fastener-channel 172 that has a narrower cross-sectional diameter than the rest of fastener-channel 172. Flaps 184 enable fastener-channel 172 to grip or otherwise hold fastener 182 therein before the threading of fastener 182 within fastener-aperture 180 has begun. This narrowed portion of the barrel of fastener-channel 172 therefore facilitates easy installation of cover plate assembly 50 by allowing the installer to quickly insert each fastener 182 by hand into its respective fastener-channel where fastener 182 is then held in place until the installer is ready to thread or screw each fastener 182 into electrical outlet box 84. This is especially beneficial when cover plate assembly 50 is being installed horizontally onto an overhead junction box such as those located upon ceilings.

Figure 8:
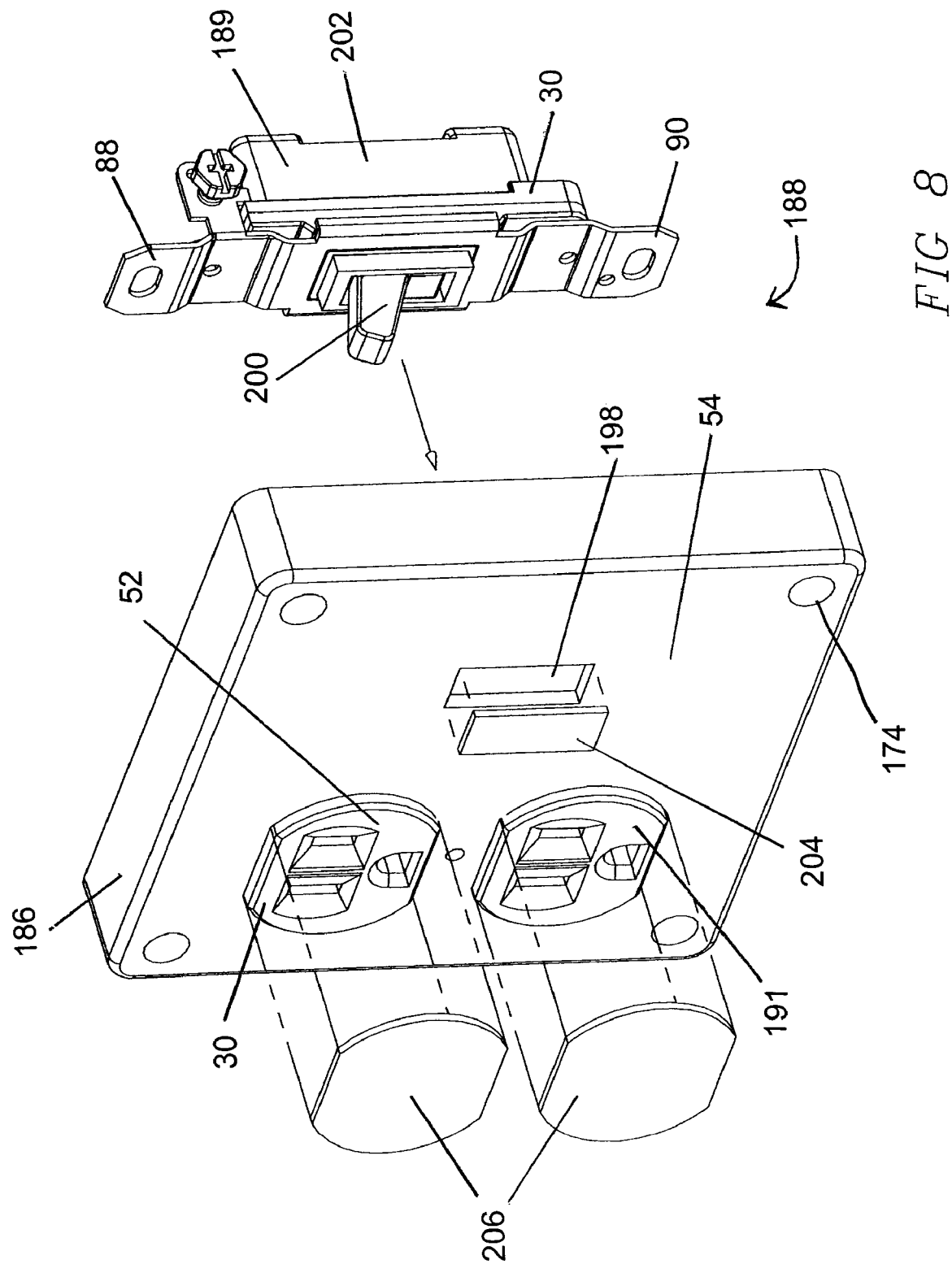
FIG. 8 is a front exploded view of another preferred cover plate assembly in accordance with this invention.
Figure 9:
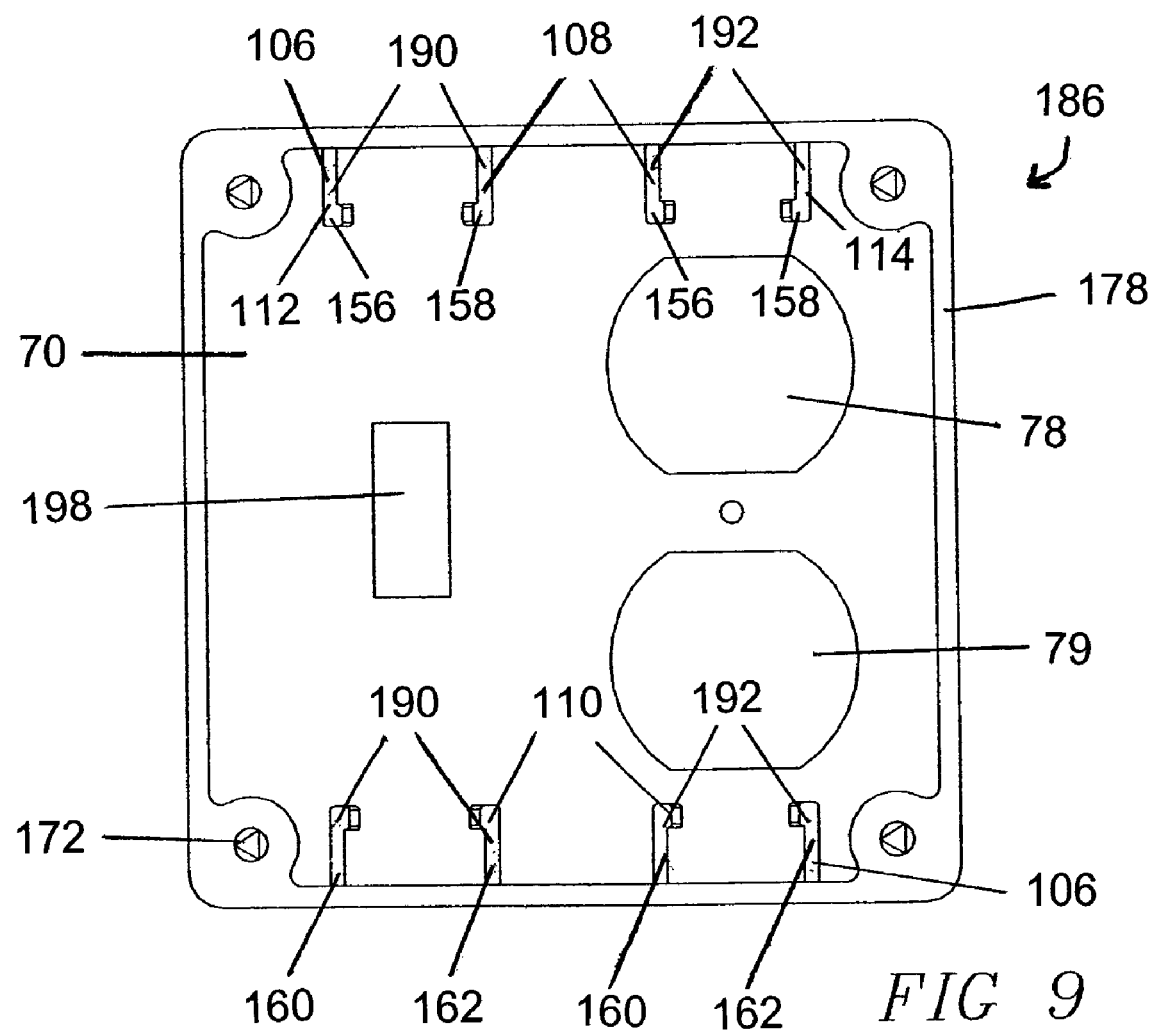
FIG. 9 is a rear view of the cover plate in FIG. 8.

Cover plate 186 depicted in FIGS. 8-9 is constructed in accordance with this invention to form a cover plate assembly 188 comprised of cover plate 186 and two electrical circuit devices 30. Top locking set 108 of cover plate 186 includes a first locking unit 190 and a second locking unit 192. Bottom locking set 110 upon cover plate likewise includes first and second locking units 190,192. As seen in FIG. 9, first locking units 190 of both locking sets 108,110 are in registry wherein top first panel 156 and top second panel 158 of the top first locking unit 190 is in alignment opposite from bottom first panel 160 and bottom second panel 162 respectively of the bottom first locking unit 190. In the same manner, top panels 156,158 of the top second locking unit 192 are in registry with bottom panels 160,162 of the bottom second locking unit 192.

To assemble cover plate assembly 188, a first electrical circuit device 189 is engaged by top and bottom first locking units 190, allowing a second electrical circuit device 191 to be received and held in place by top and bottom second locking units 192. Both circuit devices 30 are secured by locking member 106 of cover plate 186 in the manner described above. Each attachment-tab 88,90 on each circuit device 30 is inserted into and then locked beneath one of the locking units 190,192, each unit comprising a pair of first and second panels 112,114.

One skilled in the art will readily recognize, however, that cover plate 186 is not limited to just having two locking units 190,192 mounted to both the top and the bottom sections 58,60 of side wall 56. By simply extending top and bottom sections 58,60, an additional pair of top and bottom locking units 190,192 can be included to accommodate each additional electrical circuit device 30 that is desired to be incorporated into cover assembly 188.

Cover plates 48,186 can be easily modified in keeping with the present invention to accommodate a variety of electrical circuit devices 30 by simply selecting a different aperture or apertures for its front wall 54. In particular, cover 48 can be constructed with socket-apertures 78,79 to accommodate a duplex socket electrical receptacle 52 as shown in FIGS. 3-5, with a circular socket-aperture 194 to accommodate single socket outlets 196 such as those designed to receive NEMA L6 15A plugs for 250V circuits as shown in FIGS. 11-13B, or with a rectangular toggle-aperture 198 to accommodate the toggle-bar 200 upon a switch assembly 202. Cover plate 186 can likewise be configured to accommodate a variety of combinations of identical or distinct first and second electrical circuit devices 189,191. FIG. 8 demonstrates one such combination where cover plate 186 is constructed to accommodate both a duplex socket electrical receptacle 52 and a switch assembly 202.

As seen in FIG. 8, cover plate 186 is provided with removable switch insert 204 and socket punch-outs 206 upon front wall 54. Inserts 204 and punch-outs 206 give cover plate 186 added versatility by allowing the installer the freedom to decide when either or both sets of apertures 78,79,198 are needed on cover plate 186 in order to receive the corresponding circuit device 52,202.

If the installer should decide, for example, to use cover plate 186 to assemble a cover plate assembly 188 using only switch assembly 202, only switch insert 204 needs to be snapped out from toggle-aperture 198 so that switch assembly 202 can be fully engaged to cover plate 186 by having toggle-bar 200 projecting through toggle-aperture 198. Since socket-apertures 78,79 are therefore not required, punch-outs 206 can remain in place to give the exterior surface 55 of front wall 54 of cover plate 186 an uninterrupted appearance. Later, should a duplex socket electrical receptacle 52 be needed to be installed at the corresponding junction box 84, punch-outs 206 are perforated along their perimeter for easy removal for assembly of electrical receptacle 52 to cover plate 186. In the alternative, if switch assembly 202 is not originally desired when cover plate 186 is used to install electrical receptacle 52, switch insert 204 is left in place and only punch-outs 206 need be removed.

Figure 10A:
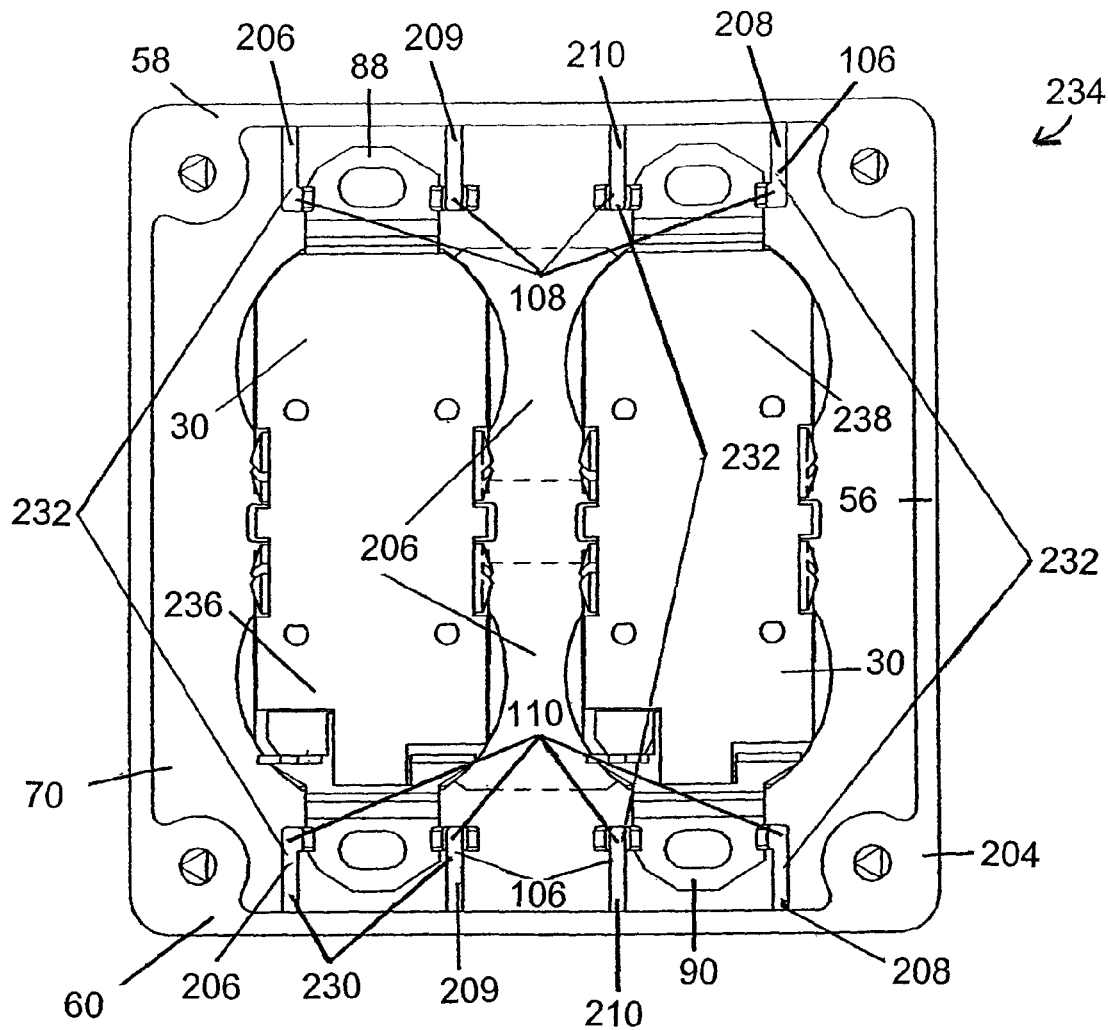
FIG. 10A is a rear view of another preferred cover plate assembly in accordance with this invention.
Figure 10B:
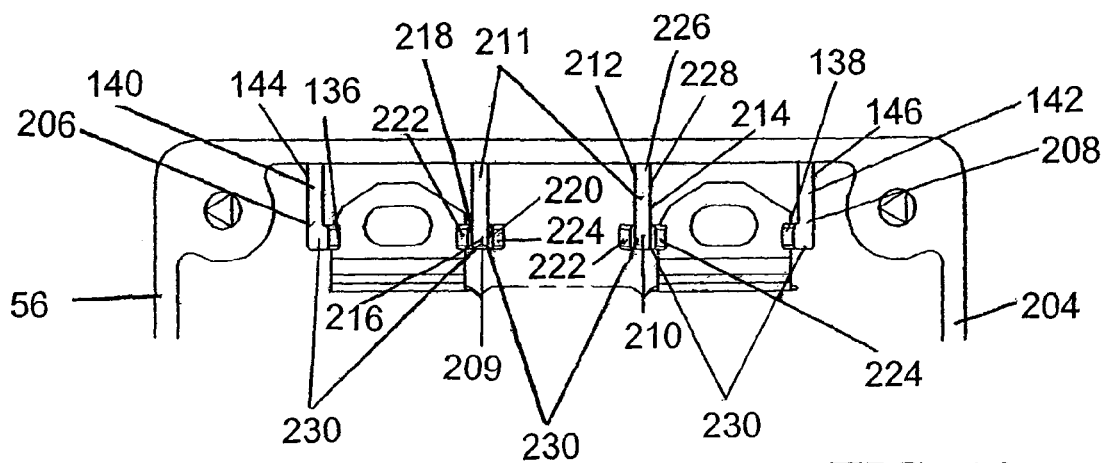
FIG. 10B is a fragmentary rear view of the cover plate assembly in FIG. 10A illustrating the top locking set.

FIG. 10A-10B illustrate another cover plate assembly 234 in accordance with this invention. Cover plate assembly 234 utilizes cover plate 204. Cover plate 204 is constructed to accommodate one or two electrical circuit devices 30. Locking member 106 for cover plate 204, as shown in FIG. 10A, is comprised of top and bottom locking sets 108,110 integrally mounted respectively to top and bottom sections 58,60 of side wall 56 to cover plate 204. Each locking set 108,110 includes first and second outer panels 206,208 and first and second intermediate panels 209,210. Top locking set 108 is in registry with bottom locking set 110 wherein each panel 206,208, 209,210 in top locking set 108 is in alignment with and opposite from its corresponding member in bottom locking set 110.

First and second outer panels 206,208 are similar in structure to both top and bottom first and second panels 156,158, 160,162 of cover plate 48 and cover plate 186. Unlike the pairing together, however, of first and second panels 112,114 as either top panels 156,158 or bottom panels 160,162 where first panel 112 is located adjacent to second panel 114, first and second outer panels 206,208 are spaced a significant distance apart and at opposite ends of locking sets 108,110. Intermediate panels 209,210 are positioned between these outer panels 206,208 at points where each is equidistant from either of its adjacent panels.

As seen in FIG. 10B, intermediate panels 209,210 are constructed with a substantially planar panel-wall 211 similar to panel-wall 118 on panels 112,114. As with panels 112,114, panel-wall 211 extends orthogonally outward from side wall 56 but is provided with first and second inner sides 212,214. The thickness between inner sides 212,214, preferably in the range of 0.07 to 0.08 in., is sufficient to provide intermediate panel 210 with the desired flexible resilience. The distal portion 216 of panel-wall 211 includes first and second projections 218,220 protruding orthogonally outward from first and second inner sides 212,214 respectively. At the distal end of each projection 218,220 is an intermediate inner surface 222, 224 extending from the intermediate upper edge 226 to the intermediate lower edge 228 of intermediate panels 209,210.

Upper edges 140,142,226 are substantially coplanar and parallel with back face 70 of cover plate 204. Lower edges 144,146,228 lie likewise in a plane that is substantially parallel with back face 70. Lower edges 144,146,228 (and thereby panels 206,208,209,210) are spaced away from back face 70 by the same retention-distance 148 as found in cover plates 12,186.

Each intermediate inner surface 222,224 is at an incline, sloping outwards as it proceeds from intermediate upper edge 226 towards intermediate lower edge 228 in a manner similar to inner surfaces 136,138 of outer panels 206,208. As shown in FIG. 10B, projection 218 upon intermediate panel 209, along with inner surface 222, face and are in registry with inner surface 136 of the immediately adjacent first outer panel 206. Projection 220 and its inner surface 224 on inner side 214 of intermediate panel 209 face and are in registry with the inner surface 222 upon second intermediate panel 210. Second intermediate panel 210 is also adjacent to intermediate panel 209 but on the opposite side from first outer panel 206. In a similar manner, inner surface 224 upon intermediate panel 210 faces and is in registry with inner surface 138 on second outer panel 208 on the side of intermediate panel 210 opposite from intermediate panel 209.

As with first and second panels 112,114, each panel 206, 208,209,210 is spaced apart from any adjacent panel by opening-distance $L_1$ as measured at the respective upper edges 140,142,226, an opening-distance 150 that is larger than the opening-distance $L_2$ measured at their respective lower edges 144,146,228. Furthermore, the spacing between adjacent panels in either locking set 108,110 is such that the length of opening-distances $L_1$ is preferably slightly greater than or equal to tab-width 102 of each attachment-tab 88,90 and the length of opening-distance $L_2$ is slightly less than tab-width 102.

In this manner, a series of locking units 230 are formed by adjacent panels 206,208,209,210 in each locking set 108,110. Each locking unit 230 in top locking set 108 is in alignment with a respective locking unit 230 in bottom locking set 110 to comprise a locking pair 232. Each locking pair 232 is adapted to receive attachment-tabs 88,90 upon electrical circuit device 30 to assembly cover plate assembly 234. Although FIG. 10A illustrates three locking pairs 232, one skilled in the art will readily recognize that an expansion of top and bottom sections 58,60 of cover plate 204 will allow additional intermediate panels to be added to both locking sets 108,110, thereby adding a locking pair with the inclusion of each new intermediate panel within each locking set 108, 110.

Two locking pairs 232 on cover plate 204 are shown in FIG. 10A securing first and second electrical circuit devices 236, 238 to form cover plate assembly 234. A pair of scored or perforated socket punch-outs 206 are positioned upon front wall 54 between locking units 230 for each locking pair 232 with only the pair associated with the locking unit 230 located between the two engaged circuit devices 236,238 being seen in FIG. 10A. If the installer had decided to use cover plate 204 to assemble a cover plate assembly 234 using only a single electrical circuit device 236, these punch-outs 206 could then have been removed so that circuit device 236 would be centered upon cover plate. In such an instance, punch-outs 206 associated with the other two locking pairs 232 would remain in place to give front wall 54 of cover plate 204 an uninterrupted appearance. Socket punch-outs 206 therefore provide for customization at the job site. Cover plate 204 can also be provided with openings that are pre-cut as shown in FIG. 3 with cover plate 48.

Although socket punch-outs 206 are illustrated in FIG. 10A, one skilled in the art will recognize that punch-outs or inserts sized to receive other types of socket or toggle projections associated with electrical circuit devices 30 can alternatively be provided. In addition, although three locking pairs 232 are provided cover plate 204, all three cannot be used to secure electrical circuit devices 30 at the same time due to the difference between the width of either attachment-tab 88,90 and that of the housing 74 to the device. As a consequence, alternating locking pairs 232 are used whenever housing 74 is wider than the width between adjacent panels 206,208,209, 210.

Cover plate assembly 240 illustrated in FIGS. 11-13B includes cover plate 242 and a choice of electrical circuit device 30 from first and second electrical circuit devices 244,246, each electrical circuit device 244,246 having a single circular socket outlet 196 such as those adapted to receive NEMA L6 plugs for 250V circuits. As shown in FIG. 13A, first electrical circuit device 244 has a first circular socket-projection 248 with a first diameter 250. First electrical circuit device 244 is preferably a single socket outlet 196 that is designed to accommodate NEMA L6 20A plugs.

Front wall 54 of cover plate 242 is provided with circular socket-aperture 194 having a diameter only slightly greater than first diameter 250 in order to snugly receive first socket-projection 248. Socket-aperture 194 is located upon front wall 54 to be in registry with first socket-projection 248 so that first socket-projection 248 extends outward from socket-aperture 194 when both attachment-tabs 88,90 of first electrical circuit device 244 are inserted into and engaged by top and bottom locking sets 108,110 to form first assembly 252.

First assembly 252 is one of two assemblies 252,253 utilizing cover plate 242 and comprising cover plate assembly 240.

Figure 11:
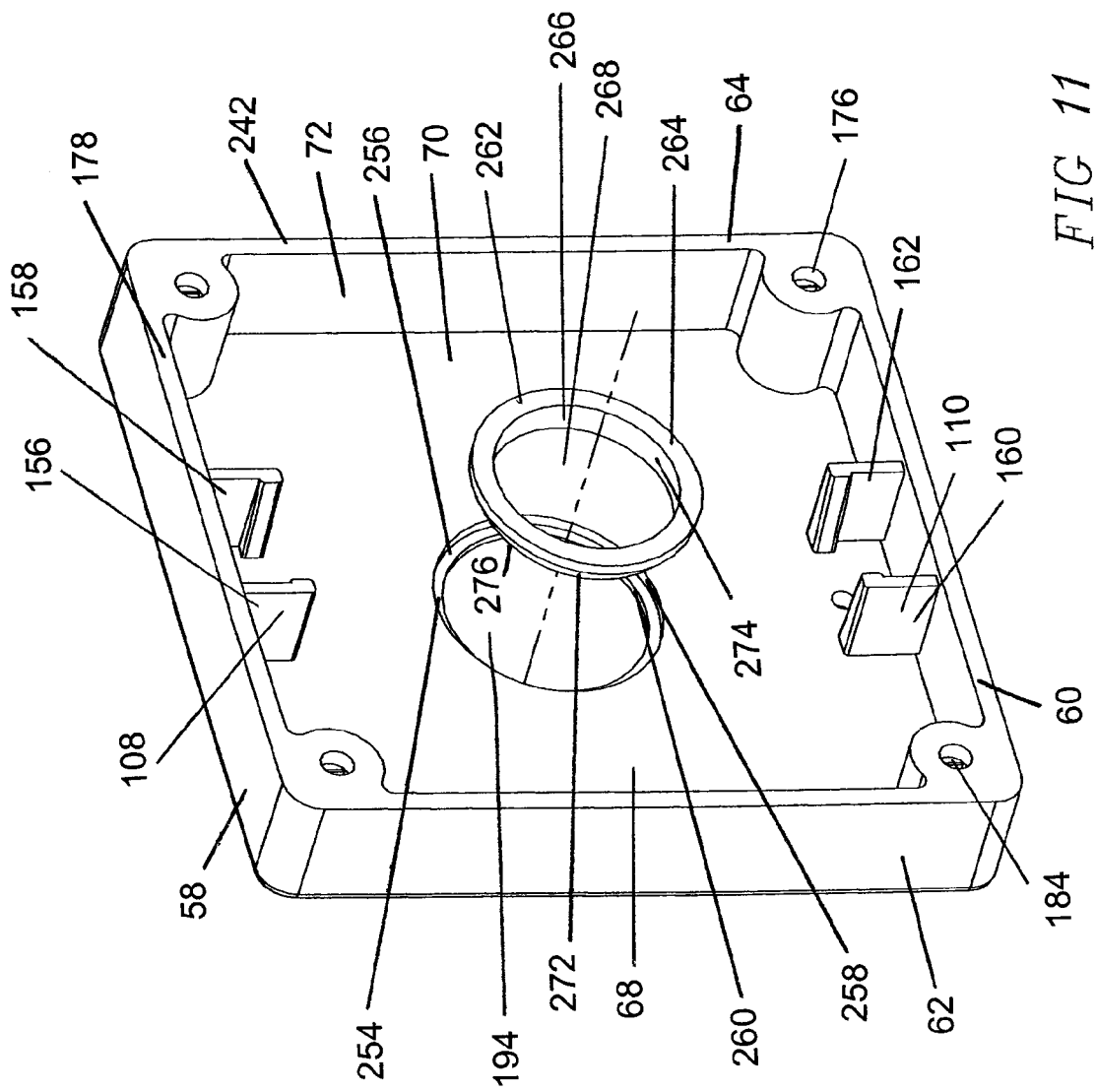
FIG. 11 is a rear exploded view of another preferred cover plate with an adapter ring in accordance with this invention.

As seen in FIG. 11, the rear surface 68 of cover plate 242 includes a recessed, circular, inner rim 254 circumscribing socket-aperture 194. Rim 254 has a uniform radial rim-surface 256 and a uniform recessed rim-sidewall 258 abutting the back face 70 of front wall 54. The presence of rim 254 upon cover plate 242 leaves socket-aperture 194 defined by aperture-sidewall 260. One will readily recognize that the thickness of front wall 54 is equivalent to the height of rim-sidewall 258 combined with the depth of aperture-sidewall 260.

Figure 12:
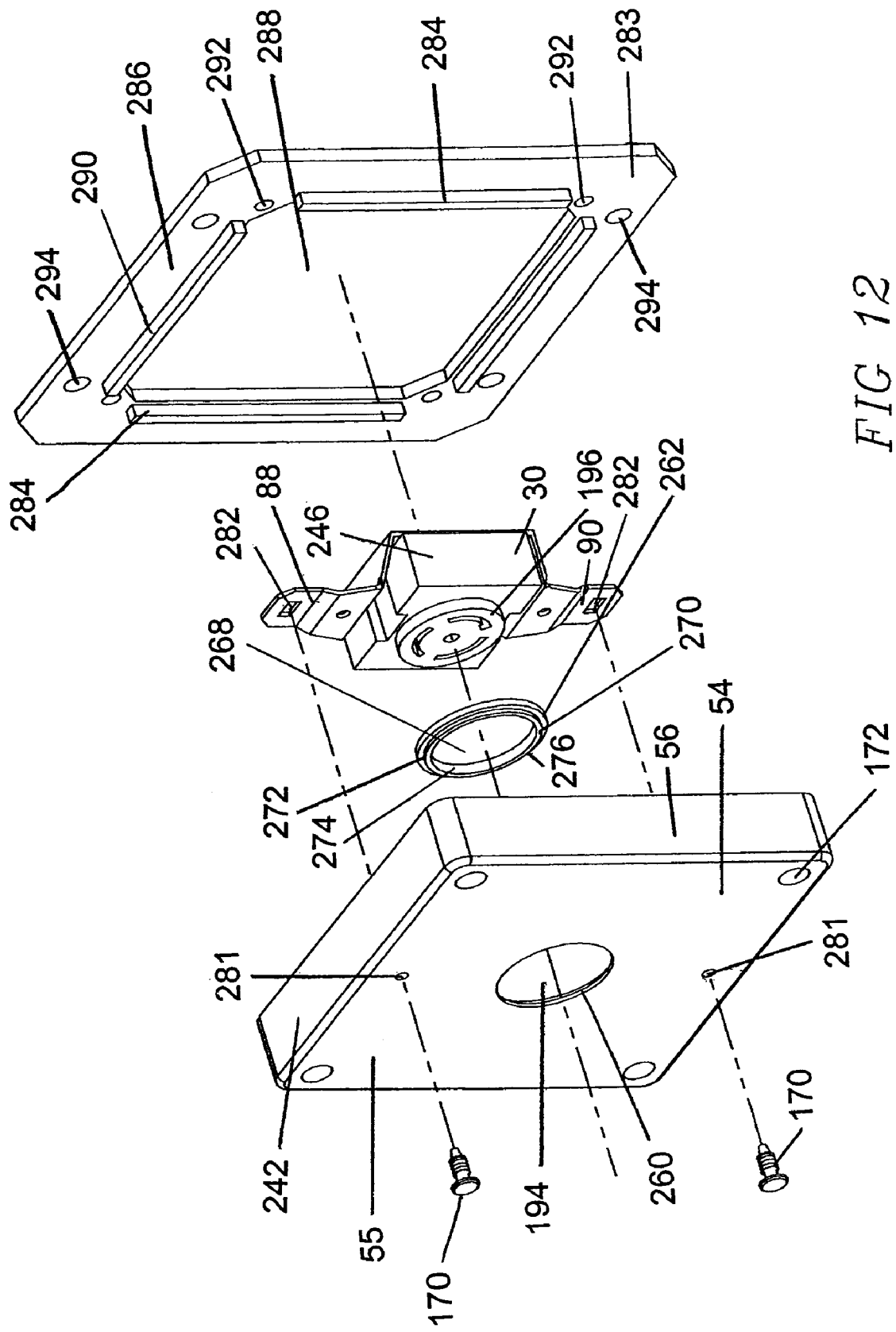
FIG. 12 is a front exploded view of another preferred cover plate assembly in accordance with this invention utilizing the cover plate and adapter ring in FIG. 11 and illustrating an adapter cover.

Rim 254 allows cover plate 242 to be combined with adapter ring 262 to adapt cover plate 242 to form second assembly 253. As illustrated in FIGS. 11-12 and 13B, adapter ring 262 is provided with an outer flange 264 and ring-wall 266. The outside diameter of ring-wall 266 at its exterior surface 272 is slightly less than the diameter of socket-aperture 194. The inner surface 274 of ring-wall 266 defines and encircles interior opening or ring-aperture 268 having the inner diameter of ring-wall 266. One skilled in the art will readily recognize that the difference between the outer and inner diameters of ring-wall 266 is defined by the size of the radially measured ring-depth 270 of ring-wall 266 between exterior surface 272 and inner surface 274.

Outer flange 264 is sized to snugly rest upon inner rim 254 when adapter ring is inserted into socket-aperture 194 from the rear of cover plate 242 as shown in FIG. 11. The width of outer flange 264 is slightly less than the width of rim-surface 256 and the depth of outer flange 264 is substantially equivalent to the height of rim-sidewall 258.

As so dimensioned, adapter ring 262 can be snapped into socket-aperture 194 so that adapter ring 262 is frictionally held in position upon rim-surface 256 by contact between rim-sidewall 258 and outer flange 264 and between exterior surface 272 and aperture-sidewall 260. With adapter ring 262 in position within cover plate 242, the only socket opening presented by front wall 54 of cover plate 242 is defined by ring-aperture 268. The height of exterior surface 272 between outer flange 264 and the front ring-edge 276 of adapter ring 262 is substantially equivalent to the depth of aperture-sidewall 260 to provide the exterior surface 55 of front wall 54 with a finished, uninterrupted appearance with the adapter ring 262 in place.

Adapter ring 262 permits an installer to utilize cover plate 242 to form second assembly 253 with second electrical circuit device 246 as illustrated in FIG. 13B. Second electrical circuit device 246 includes a second circular socket-projection 278 with a second diameter 280. Second electrical circuit device 246 is preferably a 250V single-socket outlet adapted to accommodate NEMA L6 15A plugs. Second socket-projection 278 is smaller than first socket-projection 248 and second diameter 280 is less than first diameter 250.

Ring-aperture 268 has a diameter only slightly greater than second diameter 280 so that second socket-projection 278 is snugly received. Ring-aperture 268 is positioned upon front wall 54 so that it is in registry with second socket-projection 278 when second assembly 253 is formed. To form second assembly 253, both attachment-tabs 88,90 of second electrical circuit device 246 are inserted into and engaged by top and bottom locking sets 108,110, second socket-projection 278 then extending outward from ring-aperture 268.

While cover plate assembly 240 provides for either electrical circuit device 244,246 to be firmly mounted within cover plate 242 by having both attachment-tabs 88,90 restrained by opposing locking sets 108,110 and socket-projections 248,278 received within socket-apertures 194,268, single-socket outlets, such as either of the electrical circuit devices 244,246 shown in FIGS. 11-13B, are also required by electrical code to be additionally attached to cover plate 242 by means of at least one screw as was discussed above.

Cover plate 242 has two restraining-screw apertures 281 complimentary in location to receiving-holes 282 within attachment-tabs 88,90 on electrical circuit devices 244,246 as shown by dashed lines in FIG. 12. Each restraining screw 166 is preferably a push fastener 170 made from a resilient polymeric or rubber-like material. Each push fastener 170 has parallel, compressible, circumferential threads rather than the helical thread of a plate screw 36. Moreover, push fasteners 170 can be longitudinally inserted into restraining-screw apertures 281 and extended through cover plate 242 into engagement with receiving-holes 282 of electrical circuit devices 244,246 by simply pushing them through by hand. Push fasteners 170 therefore do not require the use of a tool such as a screwdriver to rotate the fastener in order to thread them into their respective holes. One such push fastener is a push pin distributed by Hillman Corp. of Cleveland, Ohio.

One skilled in the art will readily recognize that utilization of push fasteners 170 are not required to accomplish solid engagement between electrical circuit devices 244,246 and cover plate 242 but is only resorted to in order to satisfy the aforementioned electrical code regulations. Moreover, the use of push fasteners 170 alone, in the absence of locking sets 108,110 on cover plate 242, would fail to rigidly mount electrical circuit devices 244,246 to cover plate 242 to achieve a secure cover plate assembly 240.

Also shown in FIG. 12 is adapter cover 283. Adapter cover 283 is provided with four linear rails 284 extending outward from front surface 286. Each rail 284 extends along one side of the access-opening 288 in the center of adapter cover 283. Top panels 156,158 and bottom panels 160,162 are recessed forward of rear edge 178 by a distance slightly greater than the height of rails 284. Rails 284 are positioned upon adapter cover 283 to allow adapter cover 283 to be slidably received within cover plate 242 whereby the outside surface 290 of each rail 284 is in direct contact with the interior surface 72 of each section 58,60,62,64 of side wall 56.

Cover plate 242, and thereby cover plate assembly 240, is secured to adapter cover 283 by threading fasteners (not shown) through fastener-channels 172 upon cover plate 242 into each of the attachment-apertures 292 upon adapter cover 283. Adapter cover 283, with cover plate assembly 240 attached, is then fastened to an electrical outlet box (not shown) by using additional fasteners that are threaded through expansion-apertures 294 upon adapter cover 283 into fastener-apertures upon the outlet box.

Adapter cover 283 is preferably used to convert a 4 in. cover plate into a 4¹¹⁄₁₆ in. cover plate. In this manner, an installer is able to easily use cover plates like cover plates 48,242 with even the larger 4¹¹⁄₁₆ in. junction boxes, eliminating the need to stock separate 4¹¹⁄₁₆ in. cover plates.

Although the invention has been shown and described in conjunction with specific embodiments thereof, it is to be understood that many other alternatives, modifications and variations will be apparent to those skilled in the art. Accordingly, it is intended to embrace all such alternatives, modifications and variations that fall within the spirit and broad scope of the appended claims.

The invention claimed is:

1. A cover plate assembly for mounting an electrical circuit device to an electrical outlet box comprising:
   at least one electrical circuit device having a housing with an anterior face and at least one rigid attachment member mounted to the housing, the attachment member being adapted for mounting the circuit device to the outlet box and being coplanar with the anterior face; and
   a cover plate having a body with a rear surface and a locking member rigidly mounted to the rear surface, the attachment member being slidably received and substantially restrained by the locking member, whereby the electrical circuit device is fully secured to the cover plate utilizing only the locking member.

2. The assembly of claim 1 wherein the attachment member is at least one substantially planar attachment-tab having a tab-outer edge defined by front and rear sides, the cover plate includes a front wall, the front wall having a back face and a cover-outer edge, and a side wall extending outward from the cover-outer edge, the rear surface including an interior surface of the side wall, and the locking member comprises at least first and second panels, each panel being flexibly resilient and rigidly mounted to the interior surface, the first panel being spaced apart from the second panel by an opening-distance whereby each panel contacts the tab-outer edge when the attachment-tab is inserted into the locking member.

3. The assembly of claim 2 wherein:
   the first panel has a first upper edge, a first lower edge and a first distal portion with a first inner surface extending from the first upper edge to the first lower edge;
   the second panel has a second upper edge, a second lower edge and a second distal portion with a second inner surface extending from the second upper edge to the second lower edge;
   the first inner surface is in registry with and faces the second inner surface;
   each inner surface is beveled, sloping outward from the respective panel such that the opening-distance is greatest between the first upper edge and the second upper edge;
   the tab-outer edge has a depth; and
   the first lower edge and the second lower edge are spaced above the back face by a retention-distance substantially equal to the depth whereby the attachment-tab is snugly restrained beneath the lower edges when the attachment-tab is inserted through the locking member.

4. The assembly of claim 3 wherein:
   the side wall has top and bottom sections;
   the locking member comprises top and bottom locking sets, the top locking set having top panels that include at least the first and second panels mounted to the interior surface of the top section and the bottom locking set having bottom panels that include at least the first and second panels mounted to the interior surface of the bottom section; and
   the top and bottom locking sets are integral with the body to form a monolithic cover plate.

5. The assembly of claim 4 wherein the top panels are in registry with the bottom panels.

6. The assembly of claim 5 wherein:
   the electrical circuit device is a double outlet electrical receptacle having rigid attachment-tabs at a top end and bottom end of the housing and having first and second socket-projections extending outward from the anterior face;
   the front wall includes first and second socket-apertures, each socket-aperture sized to snugly receive at least one of the socket-projections; and
   the locking sets and the socket-apertures are positioned upon the cover plate so that each attachment-tab is secured by one of the locking sets and each socket-projection is in registry with one of the socket-apertures.

7. The assembly of claim 5 wherein:
the at least one electrical circuit device comprises at least two electrical circuit devices;
each electrical circuit device includes rigid attachment-tabs at a top end and a bottom end of the respective housing;
each locking set includes at least first and second locking units, each locking unit having the first and second panels;
the locking units of the top locking set are in registry with the locking units of the bottom locking set; and
the locking sets are positioned upon the cover plate so that each attachment-tab is secured by one of the locking units so that the electrical circuit devices are fully secured to the cover plate.

8. The assembly of claim 7 wherein:
the electrical circuit devices comprise a double outlet electrical receptacle and a switch assembly;
the electrical receptacle includes first and second socket-projections extending outward from the respective anterior face;
the switch assembly includes a toggle-bar extending outward from the respective anterior face;
the front wall includes first and second socket-apertures, each socket-aperture sized to snugly receive at least one of the socket-projections, and a toggle-aperture sized to snugly receive the toggle-bar; and
the locking sets, socket-apertures and the toggle-aperture are positioned upon the cover plate whereby each electrical circuit device is secured to the cover plate so that each socket-projection is in registry with one of the socket-apertures and the toggle-bar is in registry with the toggle-aperture.

9. The assembly of claim 5 wherein:
each locking set includes at least one intermediate panel and two outer panels, each intermediate panel having two opposing intermediate inner surfaces and an intermediate upper edge;
each intermediate panel is positioned between the outer panels, each of the intermediate and outer panels being spaced equidistantly from the adjacent panel; and
each inner surface faces the inner surface upon the adjacent panel so that the opening-distance between adjacent panels is greatest between adjacent upper edges.

10. The assembly of claim 9 wherein:
the at least one electrical circuit device comprises at least two electrical circuit devices;
each electrical circuit device includes rigid attachment-tabs at a top end and a bottom end of the respective housing; and
the locking sets are positioned upon the cover plate so that each attachment-tab is secured by two adjacent panels so that both electrical circuit devices are fully secured to the cover plate.

11. The assembly of claim 1 wherein:
the at least one electrical circuit device is chosen from (a) a first electrical circuit device having a substantially circular first socket-projection extending outward from the respective anterior face with a first diameter and (b) a second electrical circuit device having a substantially circular second socket-projection extending outward from the respective anterior face with a second diameter, the second diameter being less than the first diameter;
the cover plate includes a substantially circular socket-aperture sized to snugly receive the first socket-projection; and
further comprising an adapter ring having an interior opening sized to snugly receive the second socket-projection, the adapter ring being adapted to be removably mounted onto the body of the cover plate by being slidably received within the socket-aperture,
whereby the cover plate can form either a first assembly with the first electrical circuit device by removing the adapter ring from the cover plate or a second assembly with the second electrical circuit device by mounting the adapter ring to the cover plate.

12. The assembly of claim 11 wherein the adapter ring includes an outer flange and the cover plate includes a recessed inner rim circumscribing the socket-aperture, the rim being configured to receive and support the flange when the adapter ring is mounted to the cover plate.

13. The assembly of claim 1 wherein the cover plate is polymeric and includes at least one fastener-channel positioned to be in registry with a fastener-aperture upon the electrical outlet box, the fastener-channel having front and rear openings and flexibly resilient flaps circumscribing the rear opening so that the rear opening is dimensioned to be variably narrower than the front opening, whereby the flaps are adapted to firmly hold a fastener inserted through the fastener-channel therein.

14. A method for installing an electrical circuit device to an electrical outlet box, the electrical circuit device having a housing and at least one rigid attachment member mounted to the housing where the at least one attachment member is configured to enable the electrical circuit device to be mounted to the electrical outlet box and is coplanar with an anterior face of the housing, comprising:
providing a cover plate having a body with a rear surface and a flexibly resilient locking member rigidly mounted to the rear surface;
forming a cover plate assembly by fully securing the electrical circuit device to the cover plate by only slidably inserting the at least one attachment member into the locking member;
connecting electrical wiring within the electrical outlet box to the electrical circuit device;
mounting the cover plate assembly to the electrical outlet box.

15. The method of claim 14 wherein:
the attachment member comprises at least top and bottom attachment-tabs, each attachment-tab being substantially planar and having a tab-width and tab-outer edge defined by front and rear sides, the tab-outer edge having a depth;
the cover plate includes a front wall, the front wall having a back face and a cover-outer edge, and a side wall, the side wall extending outward from the cover-outer edge and having an interior surface and at least top and bottom sections, the rear surface including the interior surface;
the locking member comprises at least top and bottom locking sets, the top locking set having top panels that include at least first and second panels rigidly mounted to the interior surface of the top section and the bottom locking set having bottom panels that include at least first and second panels rigidly mounted to the interior surface of the bottom section, each first panel being spaced apart from the respective second panel by an opening-distance, the top panels being in registry with the bottom panels; and
each panel has an upper edge, a lower edge and a distal portion with an inner surface, each inner surface being beveled in a manner where the inner surface slopes outward adjacent to the respective lower edge so that the opening-distance between adjacent panels is greatest between the upper edges and less than the tab-width between the lower edges, each inner surface being in registry with and facing the inner surface upon the adjacent panel, and the lower edges being spaced above the back face by a retention-distance substantially equal to the depth so that each attachment-tab is snugly restrained beneath the lower edges when the attachment-tab is inserted through the respective locking set.

16. The method of claim 15 wherein the forming step further comprises:
   placing the top attachment-tab between the upper edges of the top panels, the top panels being in a closed position;
   applying pressure upon the top attachment-tab towards the back face such that the tab-outer edge is brought into contact with the inner surfaces of the top panels whereby the first and second top panels are flexibly spread further apart from each other, placing the top panels in an open position;
   advancing the top attachment-tab between the top panels in the open position towards the back face to propel the top attachment-tab past the lower edges of the top panels, whereby the top panels resiliently return to the closed position to secure the top attachment-tab between the back face and the lower edges of the top panels;
   performing the placing, applying and advancing steps with the bottom attachment-tab and the bottom panels.

17. A cover plate to an electrical outlet box, the cover plate being adapted to engage at least one electrical circuit device of the type having a housing with an anterior face and at least one rigid attachment member mounted to the housing, the attachment member being adapted for mounting the circuit device to the outlet box and being coplanar with the anterior face, the cover plate comprising a body having a rear surface and a locking member rigidly mounted to the rear surface, the locking member being configured to slidably receive and substantially restrain the attachment member whereby the circuit device can be fully secured to the cover plate utilizing only the locking member.

18. The cover plate of claim 17 wherein the attachment member is a substantially planar attachment-tab having a tab-outer edge defined by front and rear sides and the locking member comprises at least two flexibly resilient first and second panels, the first panel being spaced apart from the second panel by an opening-distance whereby each panel contacts the tab-outer edge when the attachment-tab is inserted into the locking member.

19. The cover plate of claim 18 wherein the first and second panels are integral with the body to form a monolithic cover plate.

20. The cover plate of claim 18 further comprising a front wall, the front wall having a back face and a cover-outer edge, and a side wall extending outward from the cover-outer edge, the rear surface includes an interior surface of the side wall, and the first and second panels are rigidly mounted to the interior surface.

21. The cover plate of claim 20 wherein the tab-outer edge has a depth and at least one of the panels is spaced above the back face by a retention-distance substantially equal to the depth whereby the attachment-tab is snugly restrained beneath the locking member when the attachment-tab is inserted through the locking member.

22. The cover plate of claim 21 wherein the first panel has a first inner surface, a first upper edge and a first lower edge; the second panel has a second inner surface, a second upper edge and a second lower edge; the first inner surface facing the second inner surface; and both inner surfaces are beveled, each inner surface sloping outward from the lower edge such that the opening-distance is greatest between the first upper edge and the second upper edge.

23. The cover plate of claim 22 wherein each panel has a distal portion, each inner surface being beveled only along the distal portion.

24. The cover plate of claim 23 wherein the side wall has top and bottom sections and the locking member comprises top and bottom locking sets, the top locking set having the first and second panels mounted to the interior surface of the top section and the bottom locking set having the first and second panels mounted to the interior surface of the bottom section, the panels of the top locking set being in registry with the panels of the bottom locking set.

25. The cover plate of claim 24 wherein:
   each locking set includes at least first and second locking units, each locking unit having the first and second panels; and
   the locking units of the top locking set are in registry with the locking units of the bottom locking set,
whereby the first top and bottom locking units are positioned to slidably receive and substantially restrain top and bottom attachment-tabs upon a first electrical circuit device and the second top and bottom locking units are positioned to slidably receive and substantially restrain top and bottom attachment-tabs upon a second electrical circuit device so that both electrical circuit devices are fully secured to the cover plate.

26. The cover plate of claim 25 wherein each of the panels includes a proximal edge abutting the side wall, the proximal edge and the upper edge of each panel are in a plane orthogonal to the back face.

* * * * *